(12) United States Patent
Uchino

(10) Patent No.: US 12,515,601 B2
(45) Date of Patent: Jan. 6, 2026

(54) POWER SUPPLY CONTROL DEVICE, POWER SUPPLY CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takeo Uchino, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 244 days.

(21) Appl. No.: 18/037,520

(22) PCT Filed: Oct. 29, 2021

(86) PCT No.: PCT/JP2021/039936
§ 371 (c)(1),
(2) Date: May 17, 2023

(87) PCT Pub. No.: WO2022/107569
PCT Pub. Date: May 27, 2022

(65) Prior Publication Data
US 2024/0051481 A1    Feb. 15, 2024

(30) Foreign Application Priority Data
Nov. 17, 2020 (JP) ................. 2020-191092

(51) Int. Cl.
*B60R 16/033* (2006.01)
*H02J 7/00* (2006.01)

(52) U.S. Cl.
CPC .......... *B60R 16/033* (2013.01); *H02J 7/0063* (2013.01); *H02J 2310/40* (2020.01)

(58) Field of Classification Search
CPC ....... B60R 16/033; B60R 16/03; B60R 16/02; H02J 7/0063; H02J 2310/40; H02J 7/00
See application file for complete search history.

(56) References Cited

U.S. PATENT DOCUMENTS

2011/0221376 A1  9/2011  Ohshima et al.
2019/0123739 A1  4/2019  Sugisawa
(Continued)

OTHER PUBLICATIONS

International Search Report, Application No. PCT/JP2021/039936, mailed Nov. 30, 2021. ISA/Japan Patent Office.

*Primary Examiner* — Michael C Zarroli
(74) *Attorney, Agent, or Firm* — Honigman LLP

(57) ABSTRACT

A power supply control device for a vehicle controls power supply to a first load. A first controller is formed on a first substrate and controls power supply to the first load. A second controller is formed on a second substrate that is different from the first substrate, and instructs the first controller to perform an operation regarding power supply. The first controller and the second controller include a first switch and a circuit switch, respectively. The first switch and the circuit switch are provided on a current path of a current flowing via the first load. The second controller provides an instruction to switch the first switch on or off.

12 Claims, 21 Drawing Sheets

(56) References Cited

U.S. PATENT DOCUMENTS

2019/0181850 A1 6/2019 Sawano et al.
2022/0416825 A1* 12/2022 Yasunori .............. B60R 16/0231

* cited by examiner

POWER SUPPLY CONTROL DEVICE, POWER SUPPLY CONTROL METHOD, AND COMPUTER PROGRAM

CROSS-REFERENCE TO RELATED APPLICATIONS

This application is the U.S. national stage of PCT/JP2021/039936 filed on Oct. 29, 2021, which claims priority of Japanese Patent Application No. JP 2020-191092 filed on Nov. 17, 2020, the contents of which are incorporated herein.

TECHNICAL FIELD

The present disclosure relates to a power supply control device, a power supply control method, and a computer program.

BACKGROUND

JP 2010-154647A discloses a vehicle power supply control device that controls power supply from a DC power source to a load. In this power supply control device, a switch is provided on the current path of the current flowing from the DC power source to the load. The switch is connected to a switching circuit. The switching circuit switches the switch on or off according to an input signal. Thus, power supply from the DC power source to the load is controlled.

According to JP 2010-154647A, a power supply control device is realized using a switch, a switching circuit, and an output device that outputs an input signal. Regarding the power supply control device, it is preferable that the components thereof can be easily changed according to the load. For example, if the switch and the switching circuit can be changed without changing the output device, it is possible to easily realize a power supply control device that can support various loads.

Accordingly, the present disclosure aims to provide a power supply control device whose components can be easily changed according to the load, and a power supply control method and a computer program that can realize power supply control for the power supply control device.

SUMMARY

A power supply control device according to one aspect of the present disclosure is a power supply control device that is for a vehicle and controls power supply to a load, the power supply control device including: a controller that is formed on a first substrate and controls power supply to the load; and an instructor that is formed on a second substrate that is different from the first substrate, and instructs the controller to perform an operation regarding the power supply, wherein the controller includes a load switch that is provided on a current path of a current flowing via the load, the instructor includes a circuit switch provided on the current path, and a processing unit that performs processing, and the processing unit provides an instruction to switch the load on or off.

A power supply control method according to one aspect of the present disclosure is a power supply control method for a power supply control device for a vehicle, the power supply control device including: a controller that is formed on a first substrate and controls power supply to a load; and an instructor that is formed on a second substrate that is different from the first substrate, and instructs the controller to perform an operation regarding the power supply, the controller including a load switch that is provided on a current path of a current flowing via the load, the instructor including: a circuit switch provided on the current path, the power supply control method enabling a computer to carry out: a step of providing an instruction to switch off the load switch while the circuit switch is on; a step of acquiring a current value of a current flowing through the current path, after providing an instruction to switch off the load switch; a step of determining whether or not the acquired current value is higher than a current threshold value; and a step of providing an instruction to switch off the circuit switch upon determining that the current value is higher than the current threshold value.

A computer program according to one aspect of the present disclosure is A computer program for enabling a computer to control power supply in a power supply control device for a vehicle, the power supply control device including: a controller that is formed on a first substrate and controls power supply to a load; and an instructor that is formed on a second substrate that is different from the first substrate, and instructs the controller to perform an operation regarding the power supply, the controller including a load switch that is provided on a current path of a current flowing via the load, the instructor including a circuit switch provided on the current path, the computer program enabling the computer to carry out: a step of providing an instruction to switch off the load switch while the circuit switch is on; a step of acquiring a current value of a current flowing through the current path, after providing an instruction to switch off the load switch; a step of determining whether or not the acquired current value is higher than a current threshold value; and a step of providing an instruction to switch off the circuit switch upon determining that the current value is higher than the current threshold value.

Note that the present disclosure can be realized not only as a power supply control device that includes such a characteristic processing unit, but also as a power supply control method that includes such characteristic processing as steps, or as a computer program for enabling a computer to carry out such steps. In addition, the present disclosure can be realized as a semiconductor integrated circuit that realizes a part or the entirety of the power supply control device, or as a power supply control system that includes the power supply control device.

Advantageous Effects

With the power supply control device according to the present disclosure, the components thereof can be easily changed according to the load.

With the power supply control method and the computer program according to the present disclosure, it is possible to realize power supply control for the aforementioned power supply control device.

DETAILED DESCRIPTION OF PREFERRED EMBODIMENTS

Figure 1:
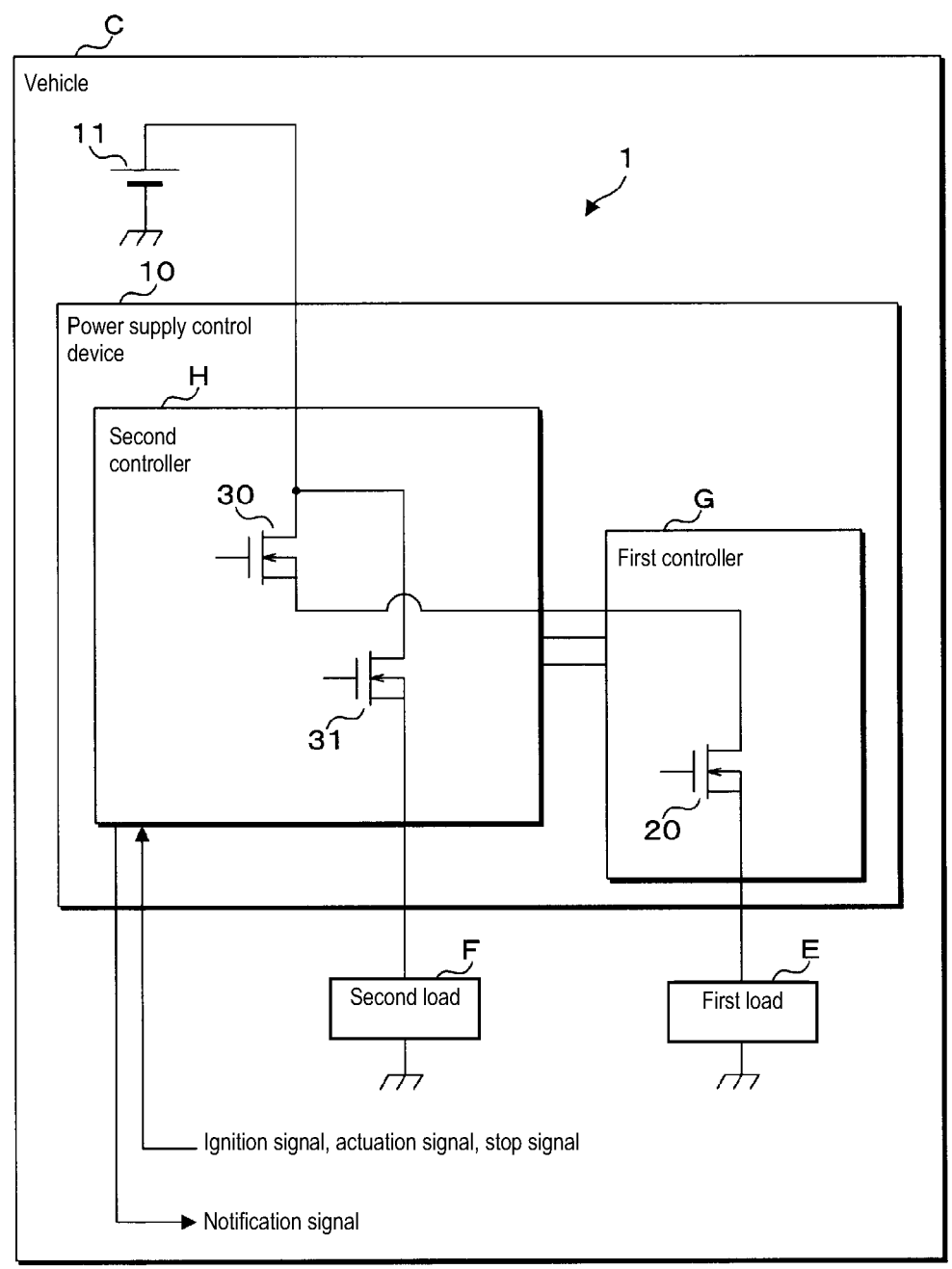
FIG. 1 is a block diagram showing a configuration of a main portion of a power system according to a first embodiment.

First, embodiments of the present disclosure will be listed and described. At least some of the embodiments described below may be combined as appropriate.

First Aspect

In accordance with a first aspect, a power supply control device according to one aspect of the present disclosure is a power supply control device that is for a vehicle and controls power supply to a load, the power supply control device including: a controller that is formed on a first substrate and controls power supply to the load; and an instructor that is formed on a second substrate that is different from the first substrate, and instructs the controller to perform an operation regarding the power supply, wherein the controller includes a load switch that is provided on a current path of a current flowing via the load, the instructor includes a circuit switch provided on the current path, and a processing unit that performs processing, and the processing unit provides an instruction to switch the load on or off.

Second Aspect

In a second aspect, in the power supply control device according to one aspect of the present disclosure, the processing unit in the instructor provides an instruction to switch off the load switch while the circuit switch is on, acquires a current value of a current flowing through the current path, after providing an instruction to switch off the load switch, determines whether or not the acquired current value is higher than a current threshold value, and provides an instruction to switch off the circuit switch upon determining that the current value is higher than the current threshold value.

Third Aspect

In a third aspect, in the power supply control device according to one aspect of the present disclosure, the processing unit in the instructor determines whether or not an ignition switch of the vehicle has been switched off, and in a case of determining that the current value is higher than the current threshold value, provides an instruction to switch off the circuit switch upon determining that the ignition switch of the vehicle has been switched off.

Fourth Aspect

In a fourth aspect, in the power supply control device according to one aspect of the present disclosure, the load is provided as two or more loads and the load switch is provided as two or more load switches, a plurality of load switches are provided on current paths of a plurality of currents flowing via a plurality of loads, respectively, and a current flowing via the circuit switch is divided into the plurality of currents.

Fifth Aspect

In a fifth aspect, in the power supply control device according to one aspect of the present disclosure, the controller includes a switching circuit that switches the load switch on or off, a current flows through the circuit switch and the load switch in this order, power is supplied to the switching circuit via the circuit switch, and the processing unit in the instructor provides an instruction to switch off the circuit switch upon the ignition switch of the vehicle being switched off.

Sixth Aspect

In a sixth aspect, a power supply control method according to one aspect of the present disclosure is a power supply control method for a power supply control device for a vehicle, the power supply control device including: a controller that is formed on a first substrate and controls power supply to a load; and an instructor that is formed on a second substrate that is different from the first substrate, and instructs the controller to perform an operation regarding the power supply, the controller including a load switch that is provided on a current path of a current flowing via the load, the instructor including: a circuit switch provided on the current path, the power supply control method including steps that are to be carried out by a computer, the steps including: a step of providing an instruction to switch off the load switch while the circuit switch is on; a step of acquiring a current value of a current flowing through the current path, after providing an instruction to switch off the load switch; a step of determining whether or not the acquired current value is higher than a current threshold value; and a step of providing an instruction to switch off the circuit switch upon determining that the current value is higher than the current threshold value.

Seventh Aspect

In a seventh aspect, a computer program according to one aspect of the present disclosure is a computer program for enabling a computer to control power supply in a power supply control device for a vehicle, the power supply control device including: a controller that is formed on a first substrate and controls power supply to a load; and an instructor that is formed on a second substrate that is different from the first substrate, and instructs the controller to perform an operation regarding the power supply, the controller including a load switch that is provided on a current path of a current flowing via the load, the instructor including a circuit switch provided on the current path, the computer program enabling the computer to carry out: a step of providing an instruction to switch off the load switch while the circuit switch is on; a step of acquiring a current value of a current flowing through the current path, after providing an instruction to switch off the load switch; a step of determining whether or not the acquired current value is higher than a current threshold value; and a step of providing an instruction to switch off the circuit switch upon determining that the current value is higher than the current threshold value.

In the power supply control device according to the above aspect, the controller and the instructor are formed on the first substrate and the second substrate, respectively. Therefore, the controller including the load switch can easily be changed according to the load. By combining various controllers with a common instructor, it is possible to realize a configuration corresponding to the load that controls operations. In addition, when the load switch in the controller is fixed at on, it is possible to stop power supply to the load by switching off the circuit switch in the instructor.

With the power supply control device, the power supply control method, and the computer program according to the above aspects, an instruction to switch off the load switch in the controller is provided while the circuit switch is on. If the current value of the current flowing via the load switch is higher than the current threshold value despite the instruction to switch off the load switch, the circuit switch in the instructor is switched off. As a result, power supply to the load can be stopped. The current threshold value is zero A or a positive current value near zero A, for example.

In the power control device according to the above aspect, the plurality of loads included in the vehicle include an electric device that is required to continue to operate if it cannot be actuated again. Examples of the loads include a headlight. When the load is such an electric device, if the current value is higher than the current threshold value despite the instruction to switch off the load switch, the circuit switch is kept on until the ignition switch is switched off.

In the power supply control device according to the above aspect, the circuit switch is provided upstream of the plurality of load switches. Therefore, power supply to the plurality of loads can be stopped by switching off the circuit switch.

In the power supply control device according to the above aspect, power supply to the switching circuit can also be stopped by switching off the circuit switch. When the ignition switch is switched off, the circuit switch is switched off. As a result, power is efficiently consumed in the switching circuit.

Hereinafter, specific examples of a power source system according to embodiments of the present disclosure will be described with reference to the drawings. Note that the present disclosure is not limited to the examples, but is indicated by the scope of the claims, and is intended to include all modifications within the scope and meaning equivalent to the scope of the claims.

First Embodiment

Configuration of Power System

FIG. 1 is a block diagram showing a configuration of a main portion of a power system 1 according to a first embodiment. The power system 1 is mounted on a vehicle C. The power system 1 includes a power supply control device 10, a DC power source 11, a first load E, and a second load F. The DC power source 11 is a battery, for example. The power supply control device 10 is connected to a positive electrode of the DC power source 11, one end of the first load E, and one end of the second load F, separately. The negative electrode of the DC power source 11, the other end of the first load E, and the other end of the second load F are grounded. Grounding is realized through connection to the body of the vehicle C, for example.

The DC power source 11 supplies power to the first load E and the second load F via the power supply control device 10. The first load E and the second load F are electric devices. The first load E operates when power is supplied to the first load E. The first load E stops operating when power supply to the first load E stops. Similarly, the second load F operates when power is supplied to the second load F. The second load F stops operating when power supply to the second load F stops. The power supply control device 10 controls power supply to the first load E and the second load F, separately.

Configuration of Power Supply Control Device 10

The power supply control device 10 includes a first controller G and a second controller H. The first controller G includes a first switch 20. The second controller H includes a circuit switch 30 and a second switch 31. The first switch 20, the circuit switch 30, and the second switch 31 are each an N-channel FET (Field Effect Transistor). The source of the first switch 20 is connected to one end of the first load E. The drain of the first switch 20 is connected to the source of circuit switch 30. The drain of the circuit switch 30 is connected to the positive electrode of the DC power source 11. The source of the second switch 31 is connected to one end of the second load F. The drain of the second switch 31 is connected to the positive electrode of the DC power source 11.

For each of the first switch 20, the circuit switch 30, and the second switch 31, when the state thereof is on, the resistance between the drain and the source thereof is sufficiently small. Therefore, a current can flow through the drain and the source. For each of the first switch 20, the circuit switch 30, and the second switch 31, when the state thereof is off, the resistance between the drain and the source thereof is sufficiently large. Therefore, no current flows through the drain and the source.

An ignition signal indicating the state of the ignition switch of the vehicle C is input to the second controller H. When the ignition switch of the vehicle C is on, the ignition signal indicates that the ignition switch is on. When the ignition switch of the vehicle C is off, the ignition signal indicates that the ignition switch is off.

When the ignition switch of the vehicle C is switched on, the second controller H switches the circuit switch 30 on. When the ignition switch is switched off, the second controller H switches the circuit switch 30 off. The first controller G switches the first switch 20 on or off while the circuit switch 30 is on.

When both the first switch 20 and the circuit switch 30 are on, a current flows from the positive electrode of the DC power source 11 to the circuit switch 30, the first switch 20, and the first load E, in this order. As a result, power is supplied to the first load E. As described above, the circuit switch 30 and the first switch 20 are provided on the current path of the current flowing via the first load E. The first switch 20 functions as a load switch.

When at least either the first switch 20 or the circuit switch 30 is off, no current flows through the first load E. At this time, power supply to the first load E is stopped.

While the circuit switch 30 is on, the second controller H instructs the first controller G to perform an operation regarding power supply to the first load E. The second controller H provides an instruction to turn the first switch 20 on or off as an operation regarding power supply to the first load E. The first controller G switches the first switch 20 on or off according to the instruction from the second controller H. Thus, power supply to the first load E is controlled. The second controller H functions as an instructor.

The second controller H switches the second switch 31 on or off. When the second switch 31 is switched from off to on, a current flows from the positive electrode of the DC power source 11 to the second switch 31 and the second load F in this order. As a result, power is supplied to the second load F. When the second switch 31 is switched from on to off, power supply to the second load F stops. Thus, the second controller H controls power supply to the second load F by switching the second switch 31 on or off.

Hereinafter, the current value of the current flowing via the first switch 20 and the first load E is denoted as the load current value. Analog current value information indicating the load current value is input to the second controller H. In addition, an actuation signal and a stop signal are input to the second controller H. The actuation signal indicates the load to be actuated, of the first load E and the second load F. The stop signal indicates the load to be stopped from operating, of the first load E and the second load F.

When the actuation signal indicating the first load E is input to the second controller H, the second controller H instructs the first controller G to turn on the first switch 20. The second controller H provides a notification regarding the occurrence of an OFF failure if the load current value is no higher than a current threshold value despite the instruction to turn on the first switch 20. Specifically, the second controller H provides a notification regarding the occurrence of an OFF failure by outputting a notification signal indicating the occurrence of an OFF failure. The current threshold value is a constant value and is set in advance. The current threshold value is zero A or a positive current value near zero A. The OFF failure is a phenomenon where the load current value does not exceed the current threshold value despite the instruction to turn on the first switch 20.

When the stop signal indicating the first load E is input to the second controller H, the second controller H instructs the first controller G to turn off the first switch 20. The second controller H provides a notification regarding the occurrence of an ON failure if the load current value is higher than the current threshold value despite the instruction to turn off the first switch 20. Specifically, the second controller H provides a notification regarding the occurrence of an ON failure by outputting a notification signal indicating the occurrence of an ON failure. The ON failure is a phenomenon where the load current value is higher than the current threshold value despite an instruction to turn off the first switch 20.

If an ON failure occurs in the first switch 20, the second controller H switches the circuit switch 30 off. Thus, power supply to the first load E is stopped. The first load E is an electric device that does not interfere with the operation of the vehicle C even if the device is constantly out of operation. The first load E is, for example, a music player.

When the actuation signal indicates the second load F, the second controller H switches the second switch 31 on. When the stop signal indicates the second load F, the second controller H switches the second switch 31 off.

Configuration of First Controller G

Figure 2:
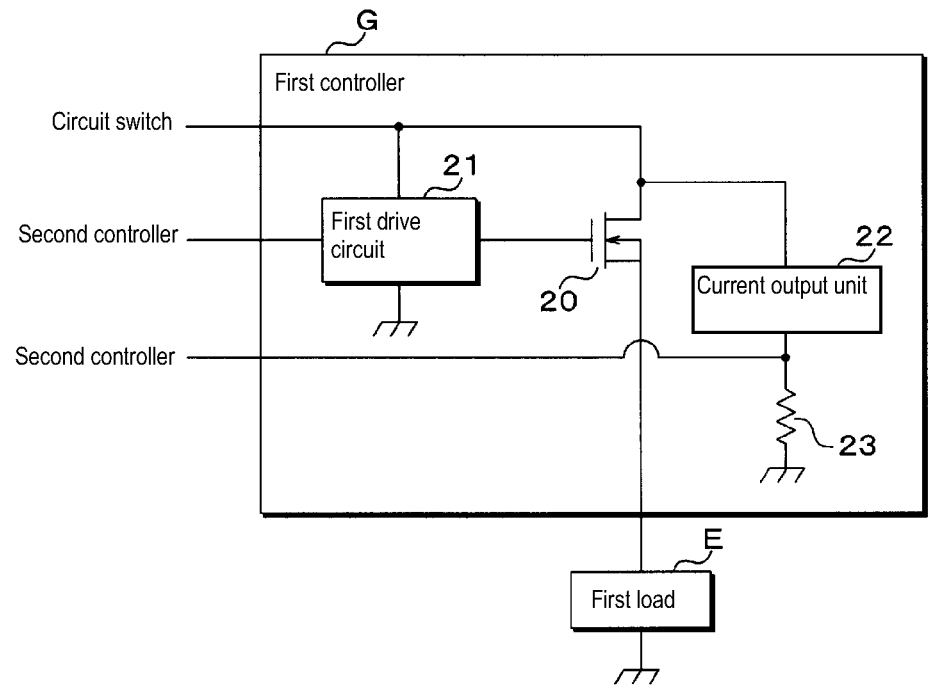
FIG. 2 is a block diagram showing a configuration of a main portion of a first controller.

FIG. 2 is a block diagram showing a configuration of a main portion of the first controller G. The first controller G includes a first drive circuit 21, a current output unit 22, and a resistor 23 in addition to the first switch 20.

As described above, the drain and the source of the first switch 20 are respectively connected to the source of the circuit switch 30 and one end of the first load E. The drain and the gate of the first switch 20 are separately connected to the first drive circuit 21. The first drive circuit 21 is further connected to the second controller H. The first drive circuit 21 is grounded.

The drain of the first switch 20 is connected to the current output unit 22. The current output unit 22 is further connected to one end of the resistor 23. The other end of the resistor 23 is grounded. The connection node between the current output unit 22 and the resistor 23 is connected to the second controller H.

When the circuit switch 30 is switched on, a current flows from the positive electrode of the DC power source 11 to the circuit switch 30 and the first drive circuit 21 in this order. As a result, power is supplied to the first drive circuit 21 via the circuit switch 30. When the circuit switch 30 is switched off, power supply to the first drive circuit 21 stops. The first drive circuit 21 operates while power is supplied to the first drive circuit 21. When power supply to the first drive circuit 21 stops, the first drive circuit 21 stops operating.

In the first switch 20, when the voltage value of the gate with reference to the potential of the source is no lower than a certain voltage value, the first switch 20 is on. In the first switch 20, when the voltage value of the gate with reference to the potential of the source is lower than the certain voltage value, the first switch 20 is off.

The second controller H outputs a high level voltage and a low level voltage to the first drive circuit 21. In the case where power is supplied to the first drive circuit 21, when the voltage output to the first drive circuit 21 switches from the low level voltage to the high level voltage, the first drive circuit 21 raises the voltage value of the gate of the first switch 20 with reference to the ground potential. Accordingly, in the first switch 20, the voltage value of the gate with reference to the potential of the source increases to a voltage value no lower than the certain voltage value. As a result, the first switch 20 is switched on. In the same case, when the voltage output to the first drive circuit 21 is switched from the high level voltage to the low level voltage, the first drive circuit 21 lowers the voltage value of the gate of the first switch 20 with reference to the ground potential. Accordingly, in the first switch 20, the voltage value of the gate with reference to the potential of the source decreases to a voltage value lower than the certain voltage value. As a result, the first switch 20 is switched off.

As described above, the first drive circuit 21 switches the first switch 20 on or off by adjusting the voltage value of the gate with reference to the potential of the source. The first drive circuit 21 functions as a switching circuit. The second controller H provides an instruction to switch on the first switch 20 by outputting the high level voltage to the first drive circuit 21. The second controller H provides an instruction to switch off the first switch 20 by outputting the low level voltage to the first drive circuit 21.

As described above, when power is not supplied to the first drive circuit 21, the first drive circuit 21 stops operating. In the case where the first drive circuit 21 has stopped operating, the voltage value of the gate in the first switch 20 with reference to the potential of the source is lower than the certain voltage value. Therefore, the first switch 20 is off.

The current output unit 22 draws a current from the drain of the first switch 20 and outputs a drawn current to the resistor 23. The current value of the current drawn by the current output unit 22 is represented by (the load current value)/(a predetermined number). As described above, the load current value is the current value of the current flowing via the first switch 20 and the first load E. The predetermined number is a constant value, and is 1000, for example. The voltage value across the resistor 23 is output to the second controller H as analog current value information. The current value information is represented by (the load current value)·(the resistance value of the resistor 23)/(the predetermined number). The symbol "·" represents the product. The resistance value of the resistor 23 and the predetermined number are constant values, and therefore the current value information indicates the load current value.

External Appearance of First Controller G

Figure 3:
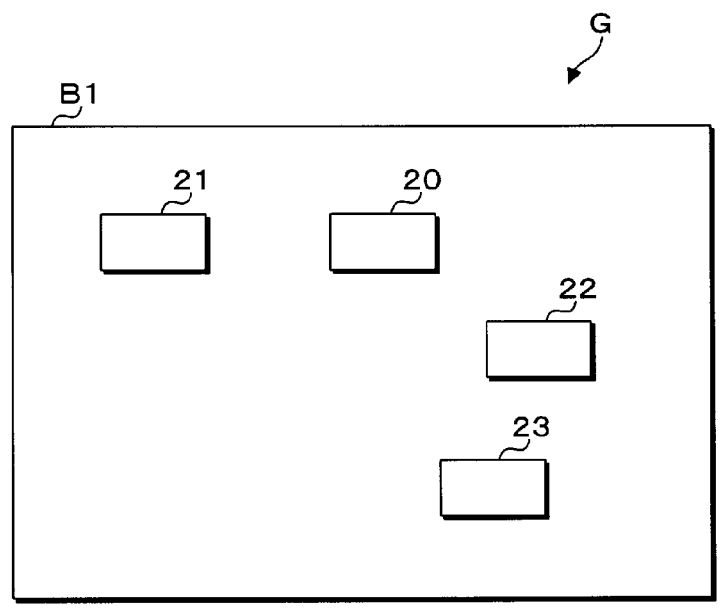
FIG. 3 is a plan view of the first controller.

FIG. 3 is a plan view of the first controller G. The first controller G is formed on a first substrate B1. As shown in FIG. 3, the first switch 20, the first drive circuit 21, the current output unit 22, and the resistor 23 are arranged on the first substrate B1. Specifically, one or more elements that constitute the first switch 20, the first drive circuit 21, the current output unit 22, and the resistor 23 are arranged on the first substrate B1.

Configuration of Second Controller H

Figure 4:
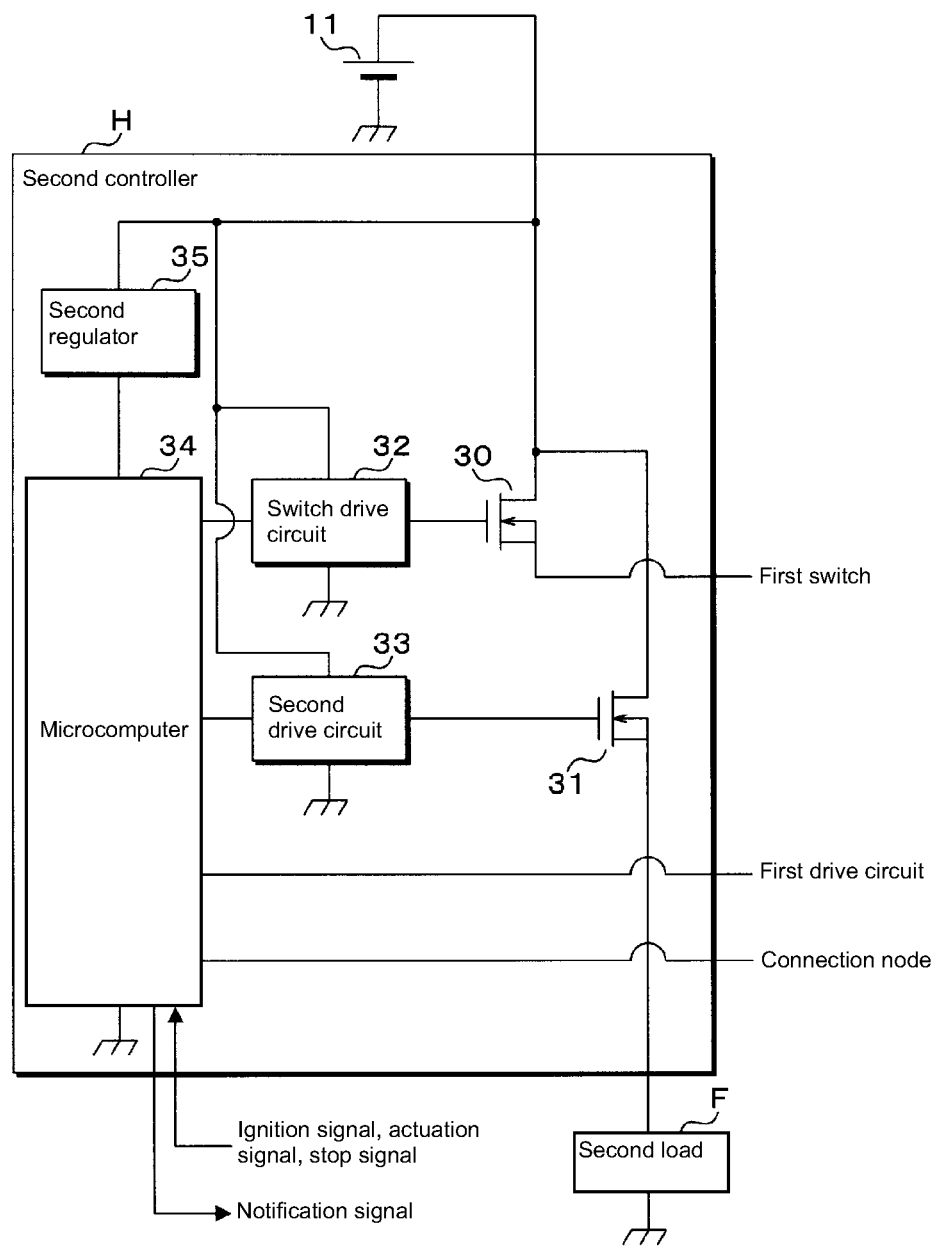
FIG. 4 is a block diagram showing a configuration of a main portion of a second controller.

FIG. 4 is a block diagram showing a configuration of a main portion of the second controller H. The second controller H includes a switch drive circuit 32, a second drive circuit 33, a microcomputer 34, and a second regulator 35 in addition to the circuit switch 30 and the second switch 31.

As described above, the respective drains of the circuit switch 30 and the second switch 31 are connected to the positive electrode of the DC power source 11. The source of the circuit switch 30 is connected to the drain of the first switch 20 included in the first controller G. The source of the second switch 31 is connected to one end of the second load F.

The gate of the circuit switch 30 and the gate of the second switch 31 are respectively connected to the switch drive circuit 32 and the second drive circuit 33. The switch drive circuit 32 and the second drive circuit 33 are each connected to the microcomputer 34. The switch drive circuit 32, the second drive circuit 33, and the microcomputer 34 are each grounded. The respective drains of the circuit switch 30 and the second switch 31 are connected to the switch drive circuit 32, the second drive circuit 33, and the second regulator 35. The second regulator 35 is further connected to the microcomputer 34.

The voltage across the DC power source 11 is input to the second regulator 35. The second regulator 35 steps down the voltage across the DC power source 11 to a certain voltage and outputs the stepped-down voltage to the microcomputer 34. As a result, a current flows from the positive electrode of the DC power source 11 to the second regulator 35 and the microcomputer 34 in this order. As a result, power is supplied to the microcomputer 34. The current flows from the positive electrode of the DC power source 11 to the switch drive circuit 32 and the second drive circuit 33. As a result, power is supplied to the switch drive circuit 32 and the second drive circuit 33.

In the circuit switch 30, when the voltage value of the gate with reference to the potential of the source is no lower than a certain voltage value, the circuit switch 30 is on. In the circuit switch 30, when the voltage value of the gate with reference to the potential of the source is lower than the certain voltage value, the circuit switch 30 is off. The microcomputer 34 outputs a high level voltage and a low level voltage to the switch drive circuit 32.

When the voltage output to the switch drive circuit 32 switches from the low level voltage to the high level voltage, the switch drive circuit 32 raises the voltage value of the gate of the circuit switch 30 with reference to the ground potential. Accordingly, in the circuit switch 30, the voltage value of the gate with reference to the potential of the source increases to a voltage value no lower than the certain voltage value. As a result, the circuit switch 30 is switched on.

When the voltage output to the switch drive circuit 32 switches from the high level voltage to the low level voltage, the switch drive circuit 32 lowers the voltage value of the gate of the circuit switch 30 with reference to the ground potential. Accordingly, in the circuit switch 30, the voltage value of the gate with reference to the potential of the source decreases to a voltage value lower than the certain voltage value. As a result, the circuit switch 30 is switched off.

As described above, the switch drive circuit 32 switches the circuit switch 30 on or off by adjusting the voltage value of the gate with reference to the potential of the source. The microcomputer 34 provides an instruction to switch on the circuit switch 30 by outputting the high level voltage to the switch drive circuit 32. The microcomputer 34 provides an instruction to switch off the circuit switch 30 by outputting the low level voltage to the switch drive circuit 32.

In the second switch 31, when the voltage value of the gate with reference to the potential of the source is no lower than a certain voltage value, the second switch 31 is on. In the second switch 31, when the voltage value of the gate with reference to the potential of the source is lower than the certain voltage value, the second switch 31 is off. The microcomputer 34 outputs a high level voltage and a low level voltage to the second drive circuit 33.

The second drive circuit 33 switches the second switch 31 on or off according to the voltage output to the second drive circuit 33. This switching is similar to the switching of the circuit switch 30 performed by the switch drive circuit 32 according to the voltage output to the switch drive circuit 32. The switching of the second switch 31 can be described by replacing the circuit switch 30 and the switch drive circuit 32 in the description of the switching of the circuit switch 30 with the second switch 31 and the second drive circuit 33, respectively.

Therefore, the second drive circuit 33 switches the second switch 31 on or off by adjusting the voltage value of the gate with reference to the potential of the source. The microcomputer 34 provides an instruction to switch on the second switch 31 by outputting the high level voltage to the second drive circuit 33. The microcomputer 34 provides an instruction to switch off the second switch 31 by outputting the low level voltage to the second drive circuit 33.

The microcomputer 34 outputs a high level voltage or a low level voltage to the first drive circuit 21. The microcomputer 34 provides an instruction to switch on the first switch 20 by outputting the high level voltage to the first drive circuit 21. The microcomputer 34 provides an instruction to switch off the first switch 20 by outputting the low level voltage to the first drive circuit 21. Analog current value information is input from the second controller H to the microcomputer 34.

An ignition signal is input to the microcomputer 34. When the ignition switch of the vehicle C is switched on, the microcomputer 34 provides an instruction to switch on the circuit switch 30 by outputting the high level voltage to the switch drive circuit 32. When the ignition switch of the vehicle C is switched off, the microcomputer 34 provides an instruction to switch off the circuit switch 30 by outputting the low level voltage to the switch drive circuit 32.

The microcomputer 34 provides an instruction to switch the first switch 20 on or off while the circuit switch 30 is on. When the actuation signal indicating the first load E is input to the microcomputer 34, the microcomputer 34 provides an instruction to switch on the first switch 20 by switching the voltage output to the first drive circuit 21 in the first controller G to the high level voltage. When the stop signal indicating the first load E is input to the microcomputer 34, the microcomputer 34 provides an instruction to switch off the first switch 20 by switching the voltage output to the first drive circuit 21 to the low level voltage.

The microcomputer 34 provides a notification regarding the occurrence of an OFF failure if the load current value does not exceed a current threshold value despite the instruction to switch on the first switch 20. Specifically, the microcomputer 34 provides a notification regarding an OFF failure by outputting a notification signal indicating the occurrence of an OFF failure. The microcomputer 34 provides a notification regarding the occurrence of an ON failure if the load current value is higher than the current threshold value despite the instruction to switch off the first switch 20. Specifically, the microcomputer 34 provides a notification regarding an ON failure by outputting a notification signal indicating the occurrence of an ON failure.

As described above, when the voltage output to the first drive circuit 21 switches to the high level voltage, the first drive circuit 21 switches the first switch 20 on. When the voltage output to the first drive circuit 21 switches to the low level voltage, the first drive circuit 21 switches the first switch 20 off. The high level voltage is higher than the low level voltage. For example, when the connection line connecting the first drive circuit 21 and the microcomputer 34 is grounded, the voltage output to the first drive circuit 21 is fixed at the low level voltage. As a result, an OFF failure occurs. For example, when the connection line connecting the first drive circuit 21 and the microcomputer 34 is electrically connected to the connection line connecting the first switch 20 and the circuit switch 30 while the circuit switch 30 is on, the voltage output to the first drive circuit 21 is fixed at the high level voltage. As a result, an ON failure occurs.

When the actuation signal indicates the second load F, the microcomputer 34 provides an instruction to switch on the second switch 31 by outputting the high level voltage to the second drive circuit 33. When the stop signal indicates the second load F, the microcomputer 34 provides an instruction to switch off the second switch 31 by outputting the low level voltage to the second drive circuit 33.

External Appearance of Second Controller H

Figure 5:
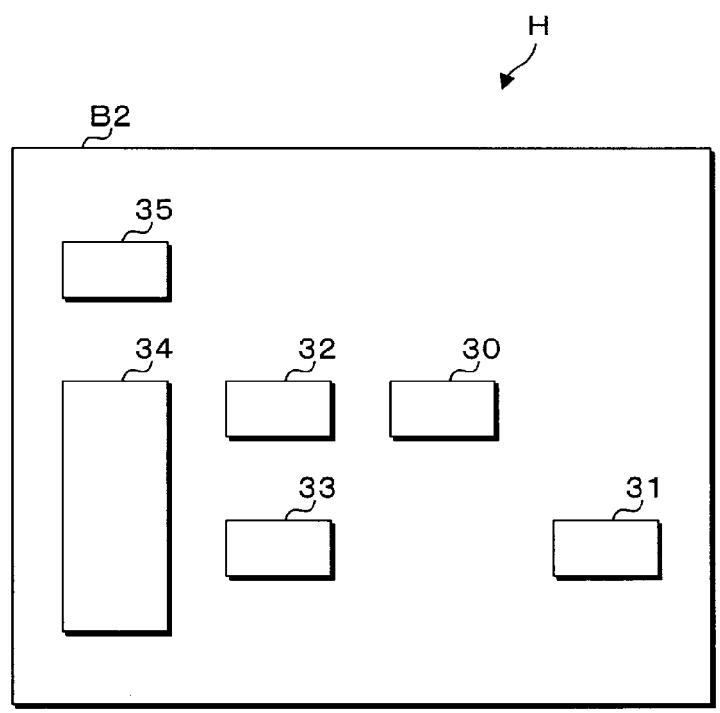
FIG. 5 is a plan view of the second controller.

FIG. 5 is a plan view of the second controller H. The second controller H is formed on a second substrate B2 that is different from the first substrate B1. As shown in FIG. 5, the circuit switch 30, the second switch 31, the switch drive circuit 32, the second drive circuit 33, the microcomputer 34, and the second regulator 35 are arranged on the second substrate B2. Specifically, one or more elements that constitute the circuit switch 30, the second switch 31, the switch drive circuit 32, the second drive circuit 33, the microcomputer 34, and the second regulator 35 are arranged on the second substrate B2.

Configuration of Microcomputer 34

Figure 6:
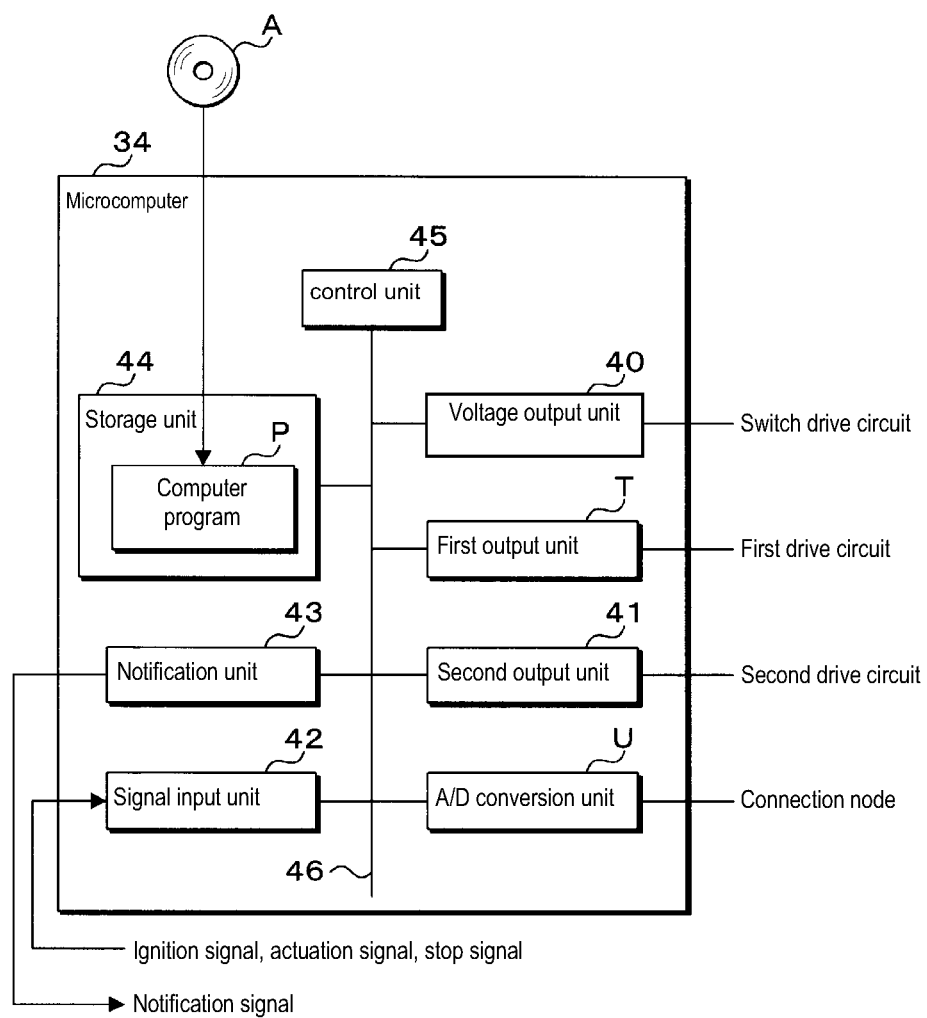
FIG. 6 is a block diagram showing a configuration of a main portion of a microcomputer.

FIG. 6 is a block diagram showing a configuration of a main portion of the microcomputer 34. The microcomputer 34 includes a voltage output unit 40, a first output unit T, a second output unit 41, an A/D conversion unit U, a signal input unit 42, a notification unit 43, a storage unit 44, and a control unit 45. These units are connected to an internal bus 46. The voltage output unit 40, the first output unit T, and the second output unit 41 are further connected to the switch drive circuit 32, the first drive circuit 21, and the second drive circuit 33, respectively. The A/D conversion unit U is further connected to the connection node between the current output unit 22 and the resistor 23 included in the first controller G.

The voltage output unit 40 outputs a high level voltage or a low level voltage to the switch drive circuit 32 according to an instruction from the control unit 45. The control unit 45 instructs the switch drive circuit 32 to switch on the circuit switch 30 by causing the voltage output unit 40 to output the high level voltage. The control unit 45 instructs the switch drive circuit 32 to switch off the circuit switch 30 by causing the voltage output unit 40 to output the low level voltage.

The first output unit T outputs a high level voltage or a low level voltage to the first drive circuit 21 according to an instruction from the control unit 45. The control unit 45 instructs the first drive circuit 21 to switch on the first switch 20 by outputting the high level voltage to the first drive circuit 21. The control unit 45 instructs the first drive circuit 21 to switch off the first switch 20 by causing the first output unit T to output the low level voltage.

The second output unit 41 outputs a high level voltage or a low level voltage to the second drive circuit 33 according to an instruction from the control unit 45. The control unit 45 instructs the second drive circuit 33 to switch on the second switch 31 by outputting the high level voltage to the second drive circuit 33. The control unit 45 instructs the second drive circuit 33 to switch off the second switch 31 by causing the second output unit 41 to output the low level voltage.

Analog current value information is input from the connection node of the first controller G to the A/D conversion unit U. The A/D conversion unit U converts the input analog current value information to digital current value information. The control unit 45 acquires the digital current value information from the A/D conversion unit U.

The ignition signal, the actuation signal, and the stop signal are input to the signal input unit 42.

The notification unit 43 provides a notification according to an instruction from the control unit 45. The notification unit 43 realizes notification by outputting a notification signal indicating the occurrence of an OFF failure or an ON failure.

The storage unit 44 is a non-volatile memory. The storage unit 44 stores a computer program P. The control unit 45 includes processing elements that perform processing, such as a CPU (Central Processing Unit). The control unit 45 functions as a processing unit. The processing elements (computers) in the control unit 45 perform switch control processing, first power supply control processing, second power supply control processing, and so on in parallel by executing the computer program P. Switch control processing is processing that is performed to switch the circuit switch 30 on or off. First power supply control processing is processing that is performed to control power supply to the first load E. Second power supply control processing is processing that is performed to control power supply to the second load F.

Note that the computer program P may be stored in a non-transitory storage medium A so as to be readable by the processing elements in the control unit 45. If this is the case, the computer program P read out by a read-out device (not shown) from the storage medium A is written to the storage unit 44. The storage medium A is an optical disk, a flexible disk, a magnetic disk, a magnetic optical disk, a semiconductor memory, or the like. The optical disc is a CD (Compact Disc)-ROM (Read Only Memory), a DVD (Digital Versatile Disc)-ROM, a BD (Blu-ray (registered trademark) Disc), or the like. The magnetic disk is, for example, a hard disk. Alternatively, the computer program P may be downloaded from an external device (not shown) connected to a communication network (not shown), and the downloaded computer program P may be written to the storage unit 44.

The number of processing elements included in the control unit 45 is not limited to one, and may be two or more. When the number of processing elements included in the control unit 45 is two or more, the plurality of processing elements may cooperate to perform switch control processing, first power supply control processing, second power supply control processing, and so on.

The storage unit 44 stores the value of a failure flag. The value of the failure flag is zero or 1, and is changed by the control unit 45. A failure flag value of zero means that neither an ON failure nor an OFF failure has occurred. A failure flag value of 1 means that at least either an ON failure or an OFF failure has occurred.

Switch Control Processing

Figure 7:
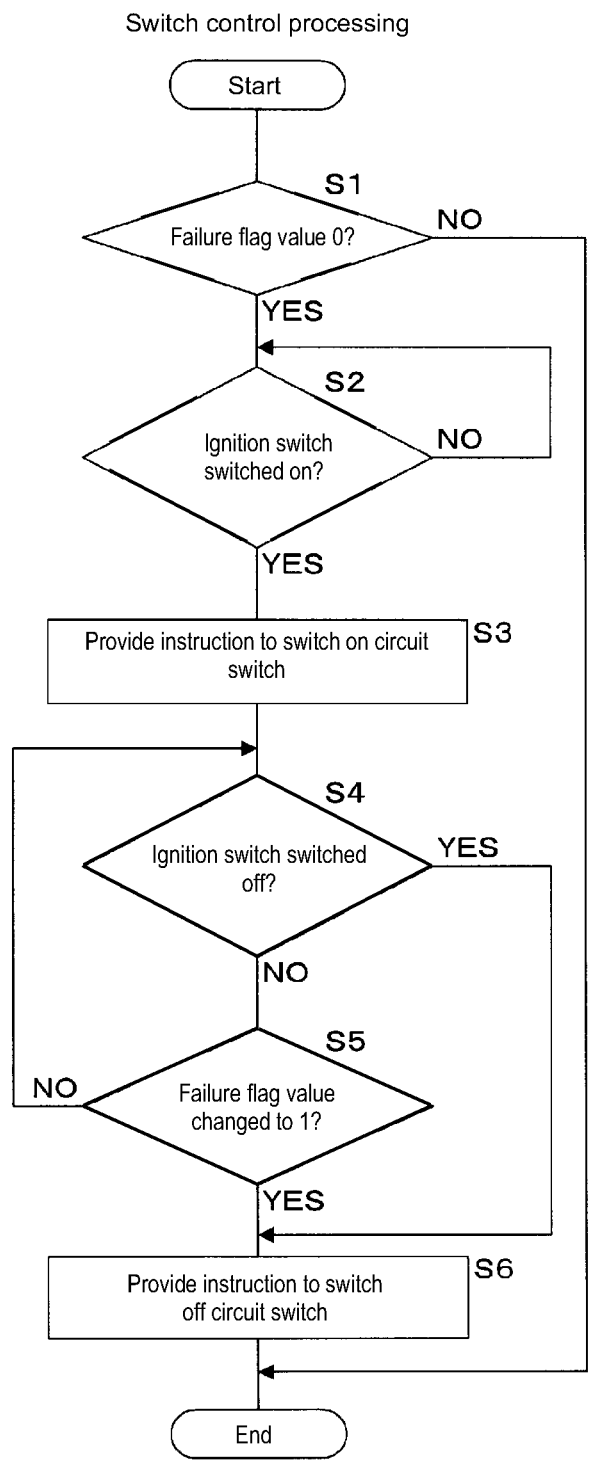
FIG. 7 is a flowchart showing procedures for switch control processing.

FIG. 7 is a flowchart showing procedures for switch control processing. Switch control processing is performed while the circuit switch 30 is off. In switch control processing, the control unit 45 first determines whether or not the value of the failure flag is zero (step S1). Upon determining that the value of the failure flag is zero (S1: YES), the control unit 45 determines whether or not the ignition switch of the vehicle C has been switched off, based on the ignition signal input to the signal input unit 42 (step S2). Upon determining that the ignition switch has not been switched on (S2: NO), the control unit 45 performs step S2 again and waits until the ignition switch is switched on.

Upon determining that the ignition switch has been switched on (S2: YES), the control unit 45 instructs the switch drive circuit 32 to switch on the circuit switch 30 by causing the voltage output unit 40 to output the high level voltage (step S3). The switch drive circuit 32 switches the circuit switch 30 on. Next, the control unit 45 determines whether or not the ignition switch of the vehicle C has been switched off, based on the ignition signal input to the signal input unit 42 (step S4). Upon determining that the ignition switch has not been switched off (S4: NO), the control unit 45 determines whether or not the value of the failure flag has been changed to 1 (step S5). The value of the failure flag is changed through first power supply control processing.

Upon determining that the value of the failure flag has not been changed to 1 (S5: NO), the control unit 45 performs step S4 and waits until the ignition switch is switched off or the value of the failure flag is changed to 1. Upon determining that the ignition switch has been switched off (S4: YES), or determining that the value of the failure flag has been changed to 1 (S5: YES), the control unit 45 instructs the switch drive circuit 32 to switch off the circuit switch 30 by causing the voltage output unit 40 to output the low level voltage (step S6). As a result, the switch drive circuit 32 switches the circuit switch 30 off.

Upon determining that the value of the failure flag is not zero (S1: NO), the control unit 45 terminates switch control processing after performing step S6. After terminating switch control processing, the control unit 45 performs switch control processing again.

As described above, when the value of the failure flag is 1, the circuit switch 30 is kept off. In the case where the value of the failure flag is zero, when the ignition switch is switched on, the circuit switch 30 is switched on. After the circuit switch 30 is switched on, when the ignition switch is switched off or the value of the failure flag is changed to 1, the circuit switch 30 is switched off.

First Power Supply Control Processing

Figure 8:
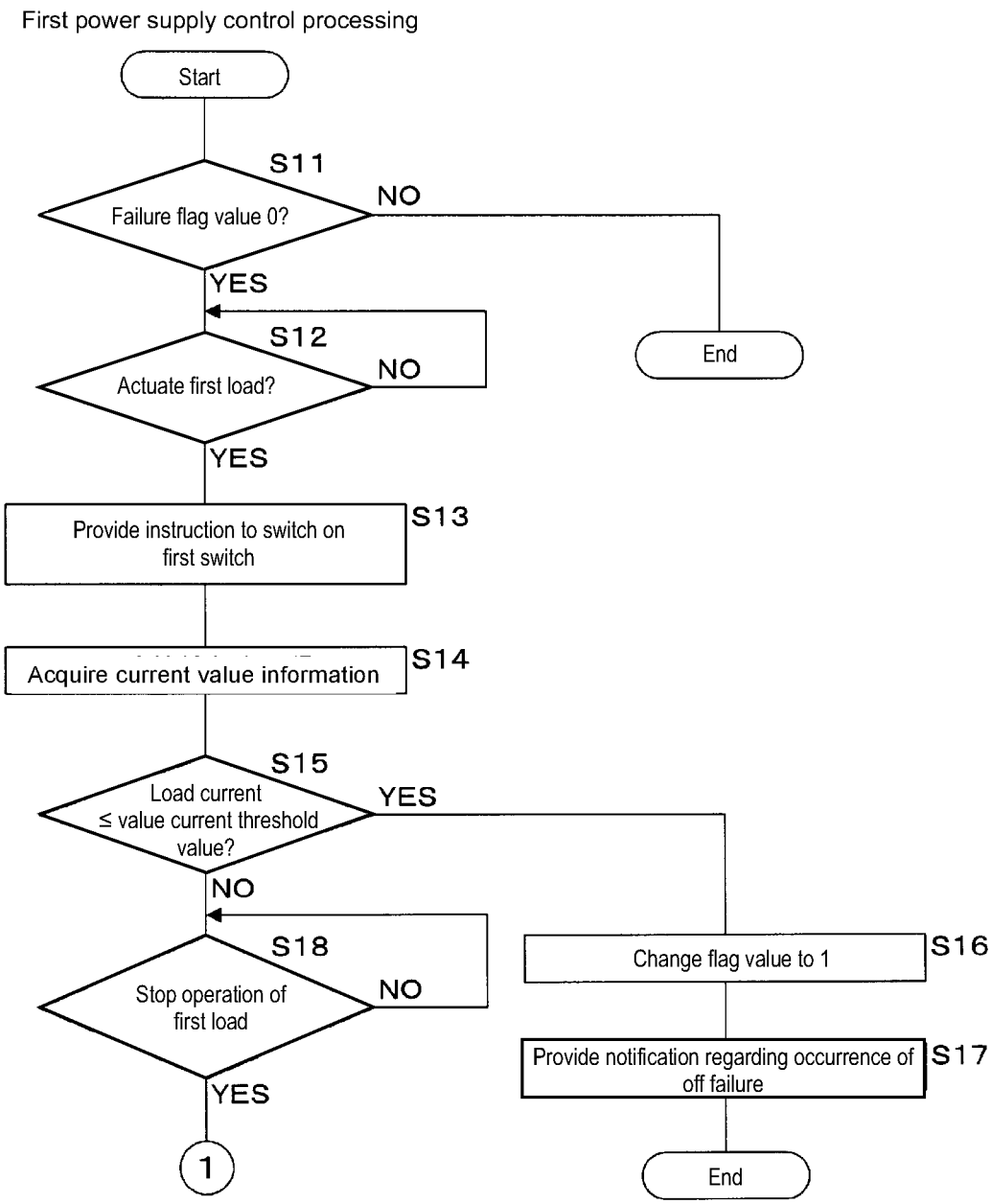
FIG. 8 is a flowchart showing procedures for first power supply control processing.
Figure 9:
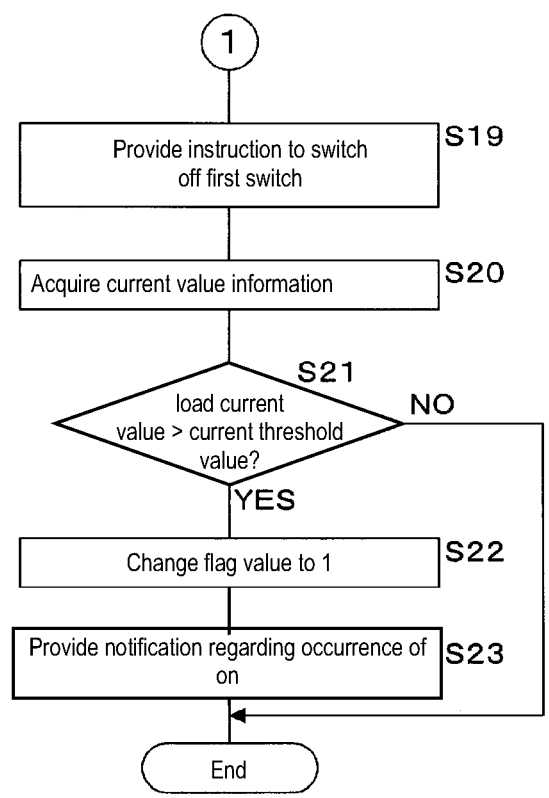
FIG. 9 is a flowchart showing procedures for first power supply control processing.

FIGS. 8 and 9 are flowcharts showing procedures for first power supply control processing. First power supply control processing is performed while the first switch 20 is off. In first power supply control processing, the control unit 45 first determines whether or not the value of the failure flag is zero (step S11). Upon determining that the value of the failure flag is not zero (S11: NO), the control unit 45 terminates first power supply control processing. Upon determining that the value of the failure flag is zero (S11: YES), the control unit 45 determines whether or not to actuate the first load E (step S12). In step S12, when an actuation signal indicating the first load E is input to the signal input unit 42, the control unit 45 makes a determination to actuate the first load E. When the actuation signal indicating the first load E is not input to the signal input unit 42, the control unit 45 determines not to actuate the first load E.

Upon determining not to actuate the first load E (S12: NO), the control unit 45 performs step S12 again and waits until the actuation signal indicating the first load E is input to the signal input unit 42. Upon determining to actuate the first load E (S12: YES), the control unit 45 instructs the first drive circuit 21 to switch on the first switch 20 by causing the first output unit T to output the high level voltage (step S13). Next, the control unit 45 acquires current value information from the A/D conversion unit U (step S14), and determines whether or not the load current value indicated by the acquired current value information is no higher than a current threshold value (step S15).

Upon determining that the load current value is no higher than the current threshold value (S15: YES), the control unit 45 changes the value of the flag to 1 (step S16), and causes the notification unit 43 to provide a notification indicating the occurrence of an OFF failure (step S17). As described above, the notification unit 43 performs notification by outputting a notification signal indicating the occurrence of an OFF failure. After performing step S17, the control unit 45 terminates first power supply control processing.

Upon determining that the load current value is higher than the current threshold value (S15: NO), the control unit

45 determines whether or not to stop the operation of the first load E (step S18). In step S18, when a stop signal indicating the first load E is input to the signal input unit 42, the control unit 45 makes a determination to stop the operation of the first load E. When the stop signal indicating the first load E is not input to the signal input unit 42, the control unit 45 determines not to stop the operation of the first load E. Upon determining not to stop the operation of the first load E (S18: NO), the control unit 45 performs step S18 again and waits until the stop signal indicating the first load E is input to the signal input unit 42.

Upon determining to stop the operation of the first load E (S18: YES), the control unit 45 provides an instruction to switch off the first switch 20 by causing the first output unit T to output the low level voltage (step S19). Next, the control unit 45 acquires current value information from the A/D conversion unit U (step S20), and determines whether or not the load current value indicated by the acquired current value information is higher than a current threshold value (step S21). Upon determining that the load current value is higher than the current threshold value (S21: YES), the control unit 45 changes the value of the flag to 1 (step S22), and causes the notification unit 43 to provide a notification indicating the occurrence of an ON failure (step S23). As described above, the notification unit 43 performs notification by outputting a notification signal indicating the occurrence of an OFF failure.

Upon determining that the load current value is no higher than the current threshold value (S21: NO), or after performing step S23, the control unit 45 terminates first power supply control processing. After terminating first power supply control processing, the control unit 45 performs first power supply control processing again. As described above, when the value of the flag is changed to 1, an instruction to switch off the circuit switch 30 is provided in switch control processing.

Second Power Supply Control Processing

Second power supply control processing is performed while the second switch 31 is off. In second power supply control processing, the control unit 45 first determines whether or not to actuate the second load F. When the actuation signal indicating the second load F is input to the signal input unit 42, the control unit 45 makes a determination to actuate the second load F. When the actuation signal indicating the second load F is not input to the signal input unit 42, the control unit 45 determines not to actuate the second load F. Upon determining not to actuate the second load F, the control unit 45 waits until the actuation signal indicating the second load F is input to the signal input unit 42.

Upon determining to actuate the second load F, the control unit 45 instructs the second drive circuit 33 to switch on the second switch 31 by causing the second output unit 41 to output the high level voltage. As a result, the second switch 31 is switched on and power is supplied to the second load F.

After instructing the second drive circuit 33 to switch on the second switch 31, the control unit 45 determines whether or not to stop the operation of the second load F. When the stop signal indicating the second load F is input to the signal input unit 42, the control unit 45 makes a determination to stop the operation of the second load F. When the stop signal indicating the second load F is not input to the signal input unit 42, the control unit 45 determines not to stop the operation of the second load F. Upon determining not to stop the operation of the second load F, the control unit 45 waits until the stop signal indicating the second load F is input to the signal input unit 42.

Upon determining to stop the operation of the second load F, the control unit 45 instructs the second drive circuit 33 to switch off the second switch 31 by causing the second output unit 41 to output the low level voltage. As a result, the second switch 31 is switched off and power supply to the second load F is stopped. After instructing the second drive circuit 33 to switch off the second switch 31, the control unit 45 terminates second power supply control processing. After terminating second power supply control processing, the control unit 45 performs second power supply control processing again.

Examples of Operations of Power Supply Control Device 10

Figure 10:
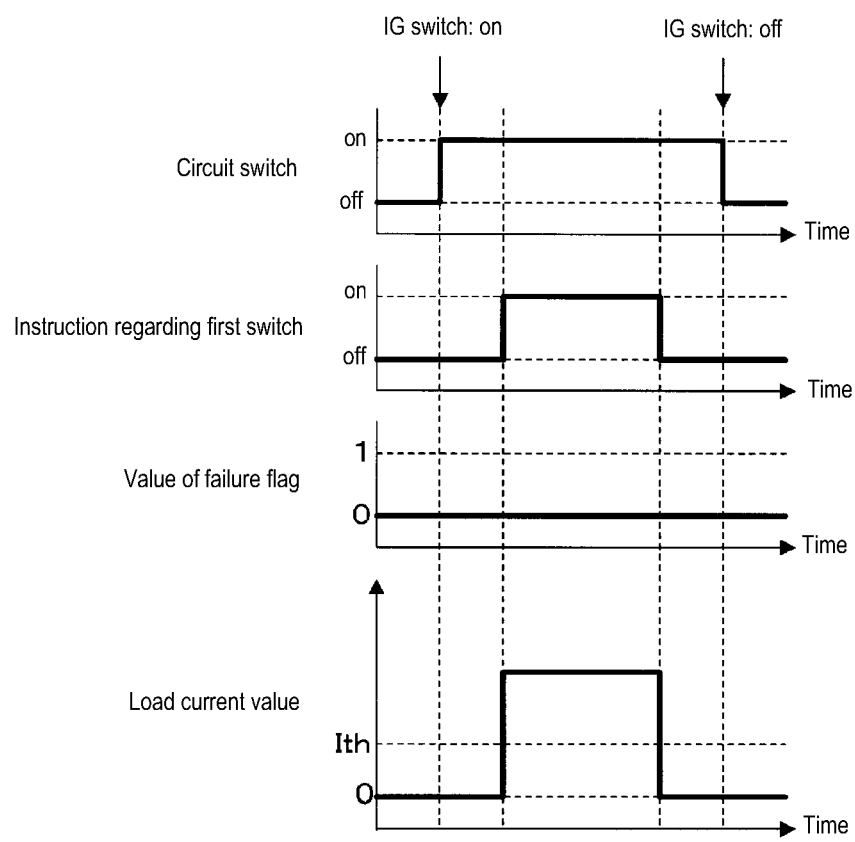
FIG. 10 is a timing chart showing a first example of an operation of a power supply control device.

FIG. 10 is a timing chart showing a first example of the operation of the power supply control device 10. FIG. 10 shows the transition of the state of the circuit switch 30, the transition of the instruction regarding the first switch 20, the transition of the value of the failure flag, and the transition of the load current value. The horizontal axis of these transitions indicates time. Examples of the instruction regarding the first switch 20 is an instruction to switch on and an instruction to switch off. In FIG. 10, the ignition switch is denoted as an IG switch. Ith represents a current threshold value.

The first example of the operation of the power supply control device 10 is an example of the operation in the case where neither an ON failure nor an OFF failure occurs in the first switch 20. As shown in FIG. 10, when the ignition switch of the vehicle C is switched on, the switch drive circuit 32 switches the circuit switch 30 on. When the ignition switch of the vehicle C is switched off, the switch drive circuit 32 switches the circuit switch 30 off.

If neither an OFF failure nor an ON failure has not occurred in the first switch 20, the value of the failure flag is zero. When the first switch 20 is off, the load current value is zero A, which is no higher than the current threshold value Ith.

The actuation signal and the stop signal are each input to the signal input unit 42 while the ignition switch is on. Therefore, the control unit 45 instructs the first drive circuit 21 to the first switch 20 switch on or off while the circuit switch 30 is on. When the actuation signal indicating the first load E is input to the signal input unit 42, the control unit 45 instructs the first drive circuit 21 to switch on the first switch 20. Thus, the first drive circuit 21 switches the first switch 20 on. As a result, the load current value exceeds the current threshold value Ith and the first load E operates.

When the stop signal indicating the first load E is input to the signal input unit 42, the control unit 45 instructs the first drive circuit 21 to switch off the first switch 20. Thus, the first drive circuit 21 switches the first switch 20 off. As a result, the load current value decreases to zero A, and the first load E stops operating.

Figure 11:
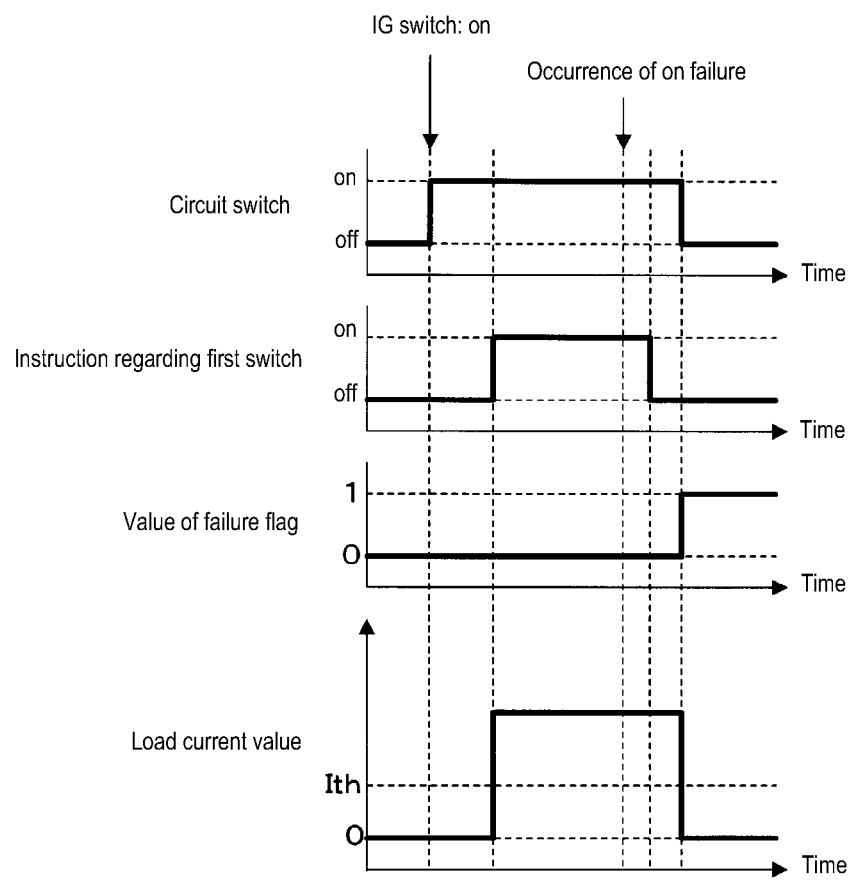
FIG. 11 is a timing chart showing a second example of the operation of the power supply control device.

FIG. 11 is a timing chart showing a second example of the operation of the power supply control device 10. As with FIG. 10, FIG. 11 shows the transition of the state of the circuit switch 30, the transition of the instruction regarding the first switch 20, the transition of the value of the failure flag, and the transition of the load current value. The horizontal axis of these transitions indicates time. As described above, the IG switch represents an ignition switch. Ith represents a current threshold value.

The second example of the operation of the power supply control device 10 is an example of the operation in the case where an ON failure occurs in the first switch 20. As shown in FIG. 11, when the ignition switch of the vehicle C is switched on, the switch drive circuit 32 switches the circuit switch 30 on. If neither an OFF failure nor an ON failure has not occurred in the first switch 20, the value of the failure flag is zero. When the first switch 20 is off, the load current value is zero A, which is no higher than the current threshold value Ith.

The control unit 45 instructs the first drive circuit 21 to switch the first switch 20 on or off while the circuit switch 30 is on. When the actuation signal indicating the first load E is input to the signal input unit 42, the control unit 45 instructs the first drive circuit 21 to switch on the first switch 20. Thus, the first drive circuit 21 switches the first switch 20 on. As a result, the first load E operates and the load current value exceeds the current threshold value Ith.

It is assumed that the voltage output to the first drive circuit 21 has been fixed at the high level voltage and an ON failure has occurred while the first switch 20 is on. When the stop signal indicating the first load E is input to the signal input unit 42, the control unit 45 instructs the first drive circuit 21 to switch off the first switch 20. However, an ON failure has occurred, and therefore the load current value does not decrease to a value no higher than the current threshold value Ith.

The control unit 45 detects the occurrence of an ON failure because the load current value is higher than the current threshold value Ith despite the instruction to switch off the first switch 20. Upon detecting the ON failure, the control unit 45 changes the value of the flag to 1 in first power supply control processing, and instructs the switch drive circuit 32 to switch off the circuit switch 30 in switch control processing. Thus, the circuit switch 30 is switched off. As a result, the load current value decreases to zero A, and the first load E stops operating.

Effects of Power Supply Control Device 10

In the power supply control device 10, the first controller G and the second controller H are formed on the first substrate B1 and the second substrate B2, respectively. Therefore, the first controller G can easily be changed according to the first load E. By combining various first controllers G with the same second controller H, it is possible to realize a configuration that supports the first load E whose operation is to be controlled. Also, if an ON failure occurs in the first switch 20, power supply to the first load E can be stopped by switching off the circuit switch 30 of the second controller H.

Furthermore, power supply to the first drive circuit 21 and the current output unit 22 in the first controller G can be stopped by the switch drive circuit 32 switching off the circuit switch 30 in the second controller H. When the ignition switch is switched off, the circuit switch 30 is switched off. As a result, power is efficiently consumed in the first drive circuit 21 and the current output unit 22.

Second Embodiment

In the first embodiment, in the case where the control unit 45 in the second controller H detects an ON failure or an OFF failure in the first switch 20, the time at which the circuit switch 30 is switched off is not limited to the time immediately after the ON failure or the OFF failure is detected in the first switch 20.

The following describes a second embodiment in terms of the differences from the first embodiment. Components other than those described below are the same as those in the first embodiment. Therefore, the same reference numerals as in the first embodiment are given to the same components as in the first embodiment, and the descriptions of those components are omitted.

When the first and second embodiments are compared with each other, the contents of the switch control processing and the first power supply control processing performed by the control unit 45 of the second controller H are different. In the following description, the switch control processing and the first power supply control processing according to the second embodiment will be described.

Switch Control Processing

Figure 12:
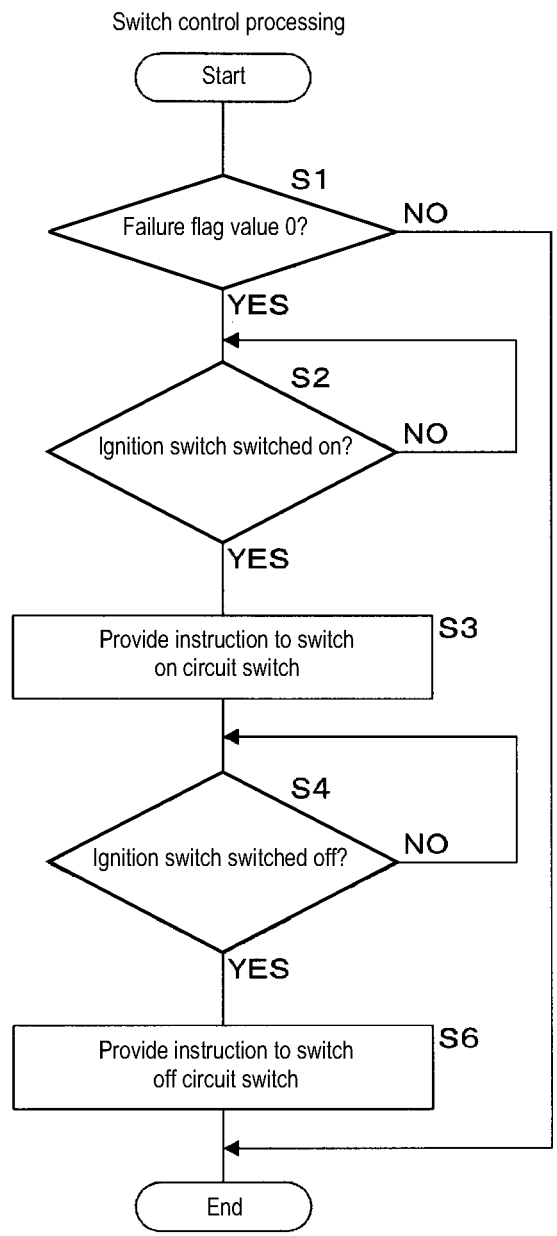
FIG. 12 is a flowchart showing procedures for switch control processing according to a second embodiment.

FIG. 12 is a flowchart showing procedures for the switch control processing according to the second embodiment. The switch control processing according to the second embodiment is performed while the circuit switch 30 is off as with the switch control processing according to the first embodiment. A portion of the switch control processing according to the second embodiment is the same as a portion of the switch control processing according to the first embodiment. Therefore, in the switch control processing according to the second embodiment, the detailed descriptions of steps S1 to S4 and S6, which are the same as those in the switch control processing according to the first embodiment, will be omitted.

Upon determining that the ignition switch has not been switched off (S4: NO), the control unit 45 performs step S4 again and waits until the ignition switch is switched off. Upon determining that the ignition switch has been switched off (S4: YES), the control unit 45 performs step S6. In step S6, the control unit 45 instructs the switch drive circuit 32 to switch off the circuit switch 30 by causing the voltage output unit 40 to output the low level voltage.

As described above, in the second embodiment, when the ignition switch is switched off after the switch drive circuit 32 switches the circuit switch 30 on, the switch drive circuit 32 switches the circuit switch 30 off. Even if the value of the failure flag is changed to 1 while the circuit switch 30 is on, the switch drive circuit 32 does not switch off the circuit switch 30.

First Power Supply Control Processing

Figure 13:
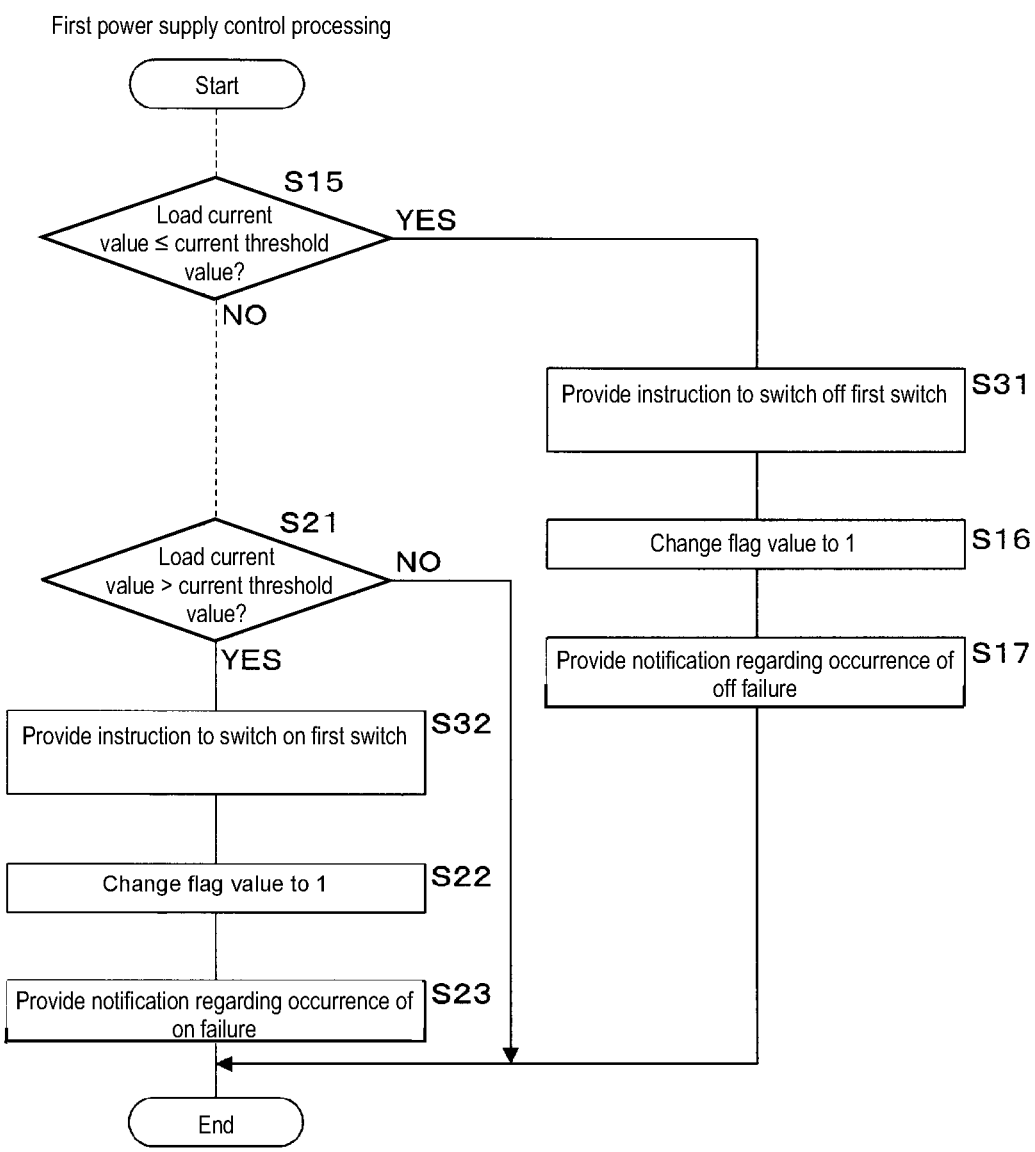
FIG. 13 is a flowchart showing procedures for first power supply control processing.

FIG. 13 is a flowchart showing procedures for first power supply control processing. The first power supply control processing according to the second embodiment is performed while the first switch 20 is off as in the first embodiment. In the first power supply control processing according to the second embodiment, the control unit 45 performs the steps S11 to S23 in the first power supply control processing according to the first embodiment in the same manner. Therefore, the detailed descriptions of steps S11 to S23 will be omitted. In the first power supply control processing according to the second embodiment, the control unit 45 performs two instances of processing in addition to steps S11 to S23.

As described for the first embodiment, the control unit 45 performs step S15 in the state where an instruction to switch on the first switch 20 has been provided. Upon determining that the load current value is no higher than the current threshold value (S15: YES), the control unit 45 provides an instruction to switch off the first switch 20 by causing the first output unit T to output the low level voltage (step S31).

If the load current value is no higher than the current threshold value when step S15 is performed, it means that an OFF failure has occurred in the first switch 20. When the control unit 45 determines that the load current value is no higher than the current threshold value, the first drive circuit 21 has been instructed to switch on the first switch 20. If an OFF failure occurs, the control unit 45 provides an instruction to switch off the first switch 20 in order to keep the first switch 20 off until the ignition switch is switched off. After performing step S31, the control unit 45 performs step S16. In step S16, the value of the flag is changed to 1.

As described for the first embodiment, the control unit 45 performs step S21 in the state where an instruction to switch off the first switch 20 has been provided. Upon determining that the load current value is higher than the current threshold value (S21: YES), the control unit 45 provides an instruction to switch on the first switch 20 by causing the first output unit T to output the high level voltage (step S32).

If the load current value is higher than the current threshold value when step S21 is performed, it means that an ON failure has occurred in the first switch 20. When the control unit 45 determines that the load current value is higher than the current threshold value, the first drive circuit 21 has been instructed to switch off the first switch 20. If an ON failure occurs, the control unit 45 provides an instruction to switch on the first switch 20 in order to keep the first switch 20 on until the ignition switch is switched off. After performing step S32, the control unit 45 performs step S22. In step S22, the value of the flag is changed to 1.

Example of Operation of Power Supply Control Device 10

Figure 14:
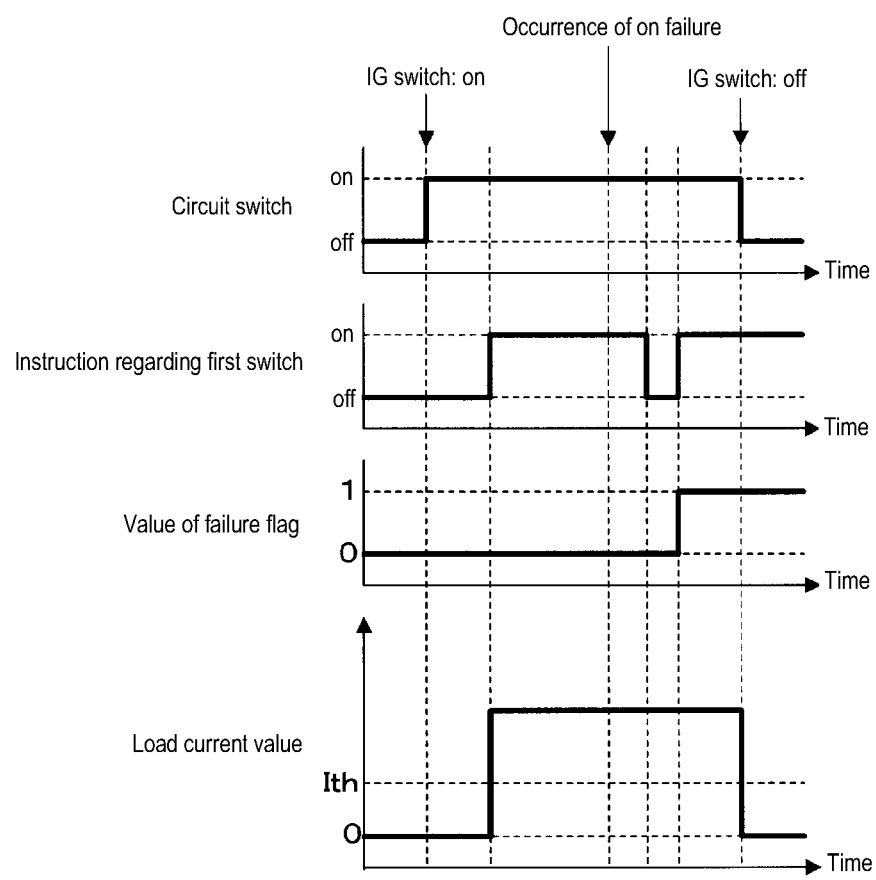
FIG. 14 is a timing chart showing an example of an operation of a power supply control device.

FIG. 14 is a timing chart showing an example of the operation of the power supply control device 10. FIG. 14 shows an example of the operation in the case where an ON failure occurs in the first switch 20. Therefore, FIG. 14 corresponds to FIG. 11. As with FIG. 11, FIG. 14 shows the transition of the state of the circuit switch 30, the transition of the instruction regarding the first switch 20, the transition of the value of the failure flag, and the transition of the load current value. As described for the first embodiment, the IG switch represents an ignition switch. Ith represents a current threshold value.

As shown in FIG. 14, when the ignition switch of the vehicle C is switched on, the switch drive circuit 32 switches the circuit switch 30 on. If neither an OFF failure nor an ON failure has not occurred in the first switch 20, the value of the failure flag is zero. When the first switch 20 is off, the load current value is zero A, which is no higher than the current threshold value Ith.

The control unit 45 instructs the first drive circuit 21 to switch the first switch 20 on or off while the circuit switch 30 is on. When the actuation signal indicating the first load E is input to the signal input unit 42, the control unit 45 instructs the first drive circuit 21 to switch on the first switch 20. Thus, the first drive circuit 21 switches the first switch 20 on. As a result, the first load E operates and the load current value exceeds the current threshold value Ith.

It is assumed that the voltage output to the first drive circuit 21 has been fixed at the high level voltage and an ON failure has occurred while the first switch 20 is on. When the stop signal indicating the first load E is input to the signal input unit 42, the control unit 45 instructs the first drive circuit 21 to switch off the first switch 20. However, an ON failure has occurred, and therefore the load current value does not decrease to a value no higher than the current threshold value Ith.

The control unit 45 detects the occurrence of an ON failure because the load current value is higher than the current threshold value Ith despite the instruction to switch off the first switch 20. Upon detecting an ON failure, the control unit 45 instructs the first drive circuit 21 to switch on the first switch 20 in first power supply control processing, and changes the value of the flag to 1. When the ignition switch is switched off, the control unit 45 instructs the switch drive circuit 32 to switch off the circuit switch 30 in switch control processing. Thus, the circuit switch 30 is switched off. As a result, the load current value decreases to zero A, and the first load E stops operating.

The first load E according to the second embodiment is an electric device that is required to continue to operate if it cannot be actuated again. The first load E according to the second embodiment is a headlight, for example. When the ignition switch is switched off, i.e., when the operation of the vehicle C is terminated, the operation of the first load E is stopped.

Effects of Power Supply Control Device 10

In the power supply control device 10 according to the second embodiment, if an ON failure occurs in the first switch 20, the circuit switch 30 is kept on until the ignition switch is switched off, so that the operation of the first load E continues. When the ignition switch is switched off, the switch drive circuit 32 switches the circuit switch 30 off and stops power supply to the first load E.

The power supply control device 10 according to the second embodiment achieves the same effects as those achieved by the power supply control device 10 according to the first embodiment.

Third Embodiment

According to the first embodiment, the circuit switch 30 is switched on when the ignition switch of the vehicle C is switched on. The time at which the circuit switch 30 is switched on is not limited to the time at which the ignition switch is switched on.

The following describes a third embodiment in terms of the differences from the first embodiment. Components other than those described below are the same as those in the first embodiment. Therefore, the same reference numerals as in the first embodiment are given to the same components as in the first embodiment, and the descriptions of those components are omitted.

Configuration of Microcomputer 34

In the microcomputer 34 according to the third embodiment, the processing elements in the control unit 45 do not perform switch control processing. When the first and third embodiments are compared with each other, the contents of first power supply control processing are different. In the following description, the first power supply control processing according to the third embodiment will be described.

First Power Supply Control Processing

Figure 15:
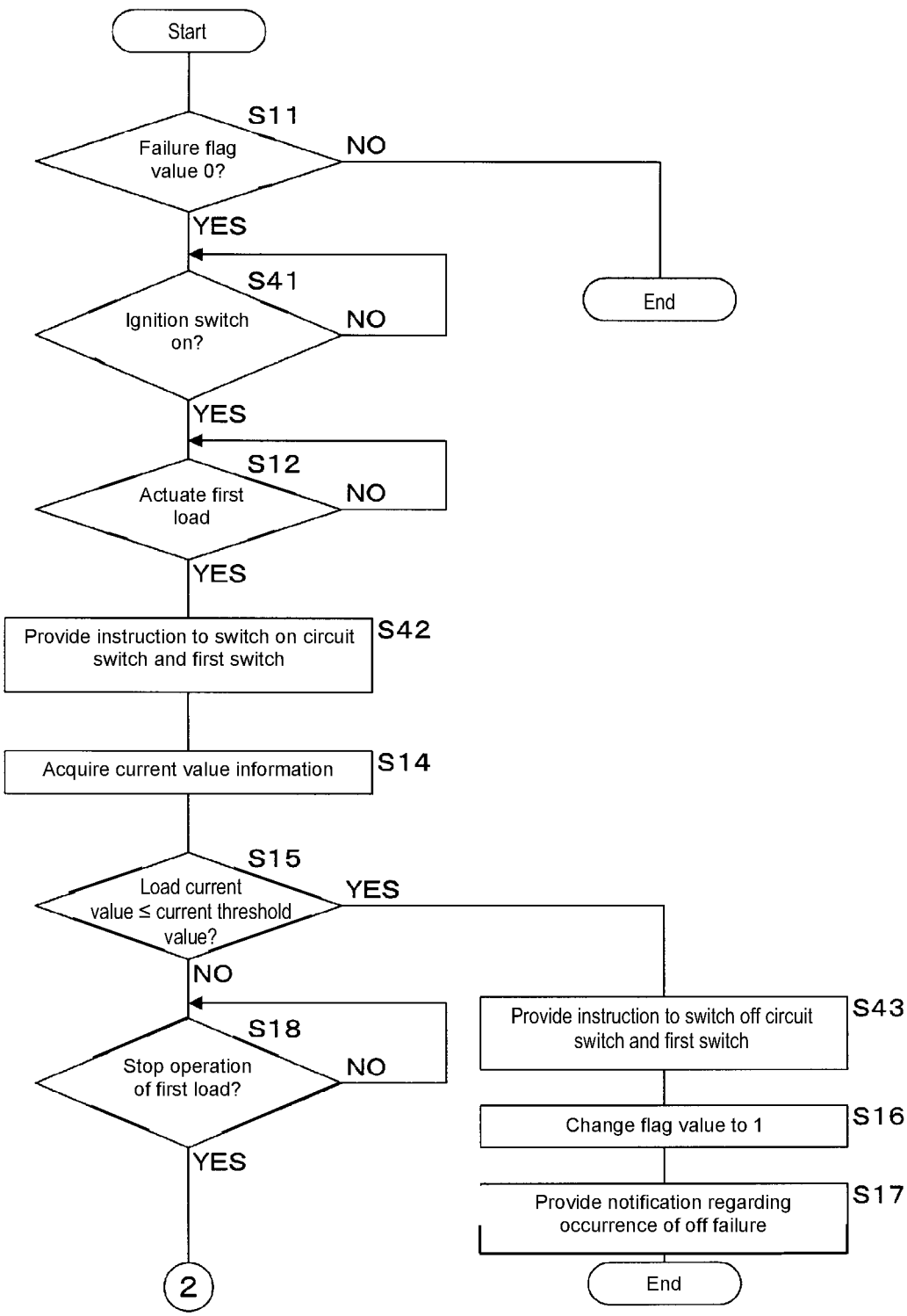
FIG. 15 is a flowchart showing procedures for first power supply control processing according to a third embodiment.
Figure 16:
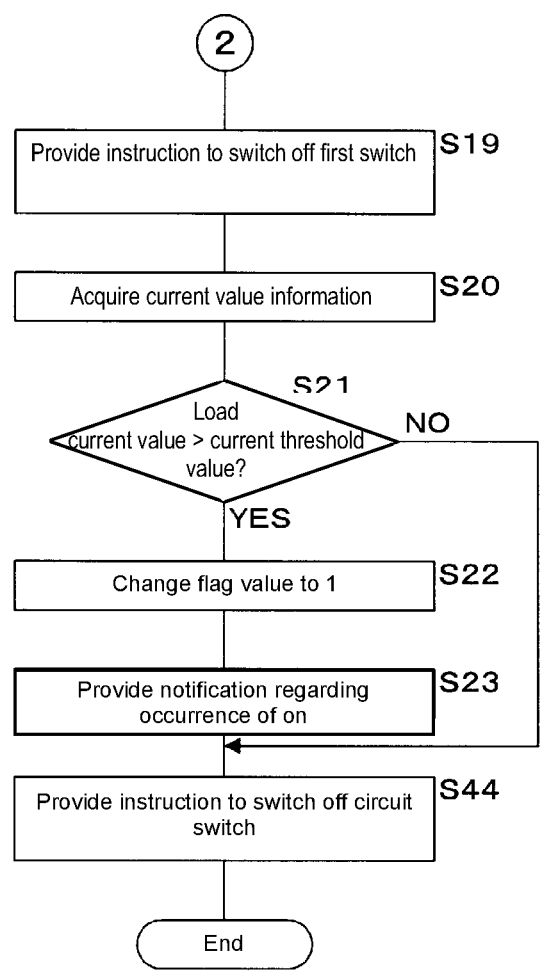
FIG. 16 is a flowchart showing procedures for first power supply control processing according to the third embodiment.

FIGS. 15 and 16 are flowcharts showing procedures for first power supply control processing. The first power supply control processing according to the third embodiment is performed while the first switch 20 is off as in the first embodiment. A portion of the first power supply control processing according to the third embodiment is the same as a portion of the first power supply control processing according to the first embodiment. Therefore, in the first power supply control processing according to the third embodiment, the descriptions of steps S11, S12, and S14 to S23, which are the same as in the first power supply control processing according to the first embodiment, will be omitted.

Upon determining that the value of the failure flag is not zero (S11: NO), the control unit 45 determines whether or not the ignition switch of the vehicle C is on, based on the ignition signal input to the signal input unit 42 (step S41). Upon determining that the ignition switch is not on (S41: NO), the control unit 45 performs step S41 again, and waits until the ignition switch is switched on. Upon determining that the ignition switch is on (S41: YES), the control unit 45 performs step S12.

Upon determining to actuate the first load E (S12: YES), the control unit 45 instructs the switch drive circuit 32 and the first drive circuit 21 to switch on the circuit switch 30 and the first switch 20, respectively (step S42). The control unit 45 instructs the switch drive circuit 32 to switch on the circuit switch 30 by causing the voltage output unit 40 to output the high level voltage. As in the first embodiment, the control unit 45 instructs the first drive circuit 21 to switch on the first switch 20 by causing the first output unit T to output the high level voltage. After performing step S42, the control unit 45 performs step S14.

The control unit 45 performs step S15 in the state where instructions to switch on the circuit switch 30 and the first switch 20 have been provided. Upon determining that the load current value is no higher than the current threshold value (S15: YES), the control unit 45 instructs the switch drive circuit 32 and the first drive circuit 21 to switch off the circuit switch 30 and the first switch 20, respectively (step S43). The control unit 45 instructs the switch drive circuit 32 to switch off the circuit switch 30 by causing the voltage output unit 40 to output the low level voltage. As in the first embodiment, the control unit 45 instructs the first drive circuit 21 to switch off the first switch 20 by causing the first output unit T to output the low level voltage. After performing step S43, the control unit 45 performs step S16.

As described for the first embodiment, the control unit 45 performs step S21 in the state where an instruction to switch off the first switch 20 has been provided. Upon determining that the load current value is no higher than the current threshold value (S21: NO), or after performing step S23, the control unit 45 provides an instruction to switch off the circuit switch 30 (step S44). After performing step S44, the control unit 45 terminates first power supply control processing.

Examples of Operations of Power Supply Control Device 10

Figure 17:
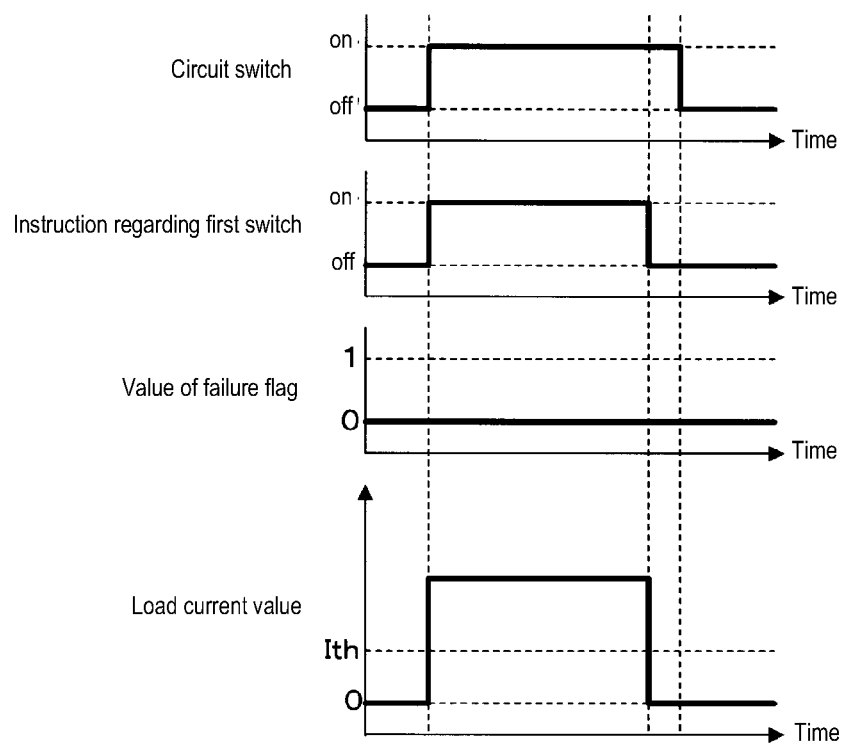
FIG. 17 is a timing chart showing a first example of an operation of a power supply control device.

FIG. 17 is a timing chart showing a first example of the operation of the power supply control device 10. FIG. 17 corresponds to FIG. 10. As with FIG. 10, FIG. 17 shows the transition of the state of the circuit switch 30, the transition of the instruction regarding the first switch 20, the transition of the value of the failure flag, and the transition of the load current value. As described for the first embodiment, the IG switch represents an ignition switch. Ith represents a current threshold value.

The first example of the operation of the power supply control device 10 is an example of the operation in the case where neither an ON failure nor an OFF failure occurs in the first switch 20. If neither an OFF failure nor an ON failure has not occurred in the first switch 20, the value of the failure flag is zero. When the first switch 20 or the circuit switch 30 is off, the load current value is zero A, which is no higher than the current threshold value Ith.

When the actuation signal indicating the first load E is input to the signal input unit 42, the control unit 45 instructs the switch drive circuit 32 and the first drive circuit 21 to switch on the circuit switch 30 and the first switch 20, respectively. Thus, the circuit switch 30 and the first switch 20 are switched on. As a result, a current flows from the positive electrode of the DC power source 11 to the circuit switch 30, the first switch 20, and the first load E, in this order. The load current value exceeds the current threshold value Ith and the first load E operates.

When the stop signal indicating the first load E is input to the signal input unit 42, the control unit 45 instructs the first drive circuit 21 to switch off the first switch 20. Thus, the first drive circuit 21 switches the first switch 20 off. As a result, the load current value decreases to zero A, and the first load E stops operating. After confirming that the load current value has decreased to a value no higher than the current threshold value Ith, the control unit 45 instructs the switch drive circuit 32 to switch off the circuit switch 30. Thus, the circuit switch 30 is switched off.

Figure 18:
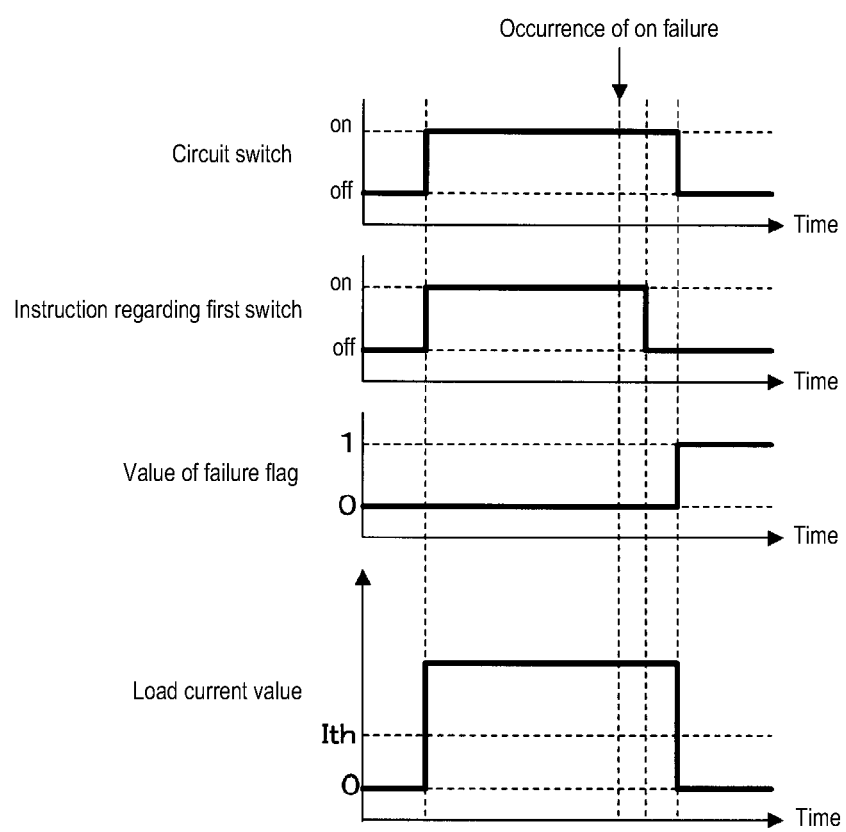
FIG. 18 is a timing chart showing a second example of the operation of the power supply control device.

FIG. 18 is a timing chart showing a second example of the operation of the power supply control device 10. FIG. 18 corresponds to FIG. 11. As with FIG. 11, FIG. 18 shows the transition of the state of the circuit switch 30, the transition of the instruction regarding the first switch 20, the transition of the value of the failure flag, and the transition of the load current value. As described above, the IG switch represents an ignition switch. Ith represents a current threshold value.

The second example of the operation of the power supply control device 10 is an example of the operation in the case where an ON failure occurs in the first switch 20. If neither an OFF failure nor an ON failure has not occurred in the first switch 20, the value of the failure flag is zero. When the first switch 20 or the circuit switch 30 is off, the load current value is zero A, which is no higher than the current threshold value Ith.

As described above, when the actuation signal indicating the first load E is input to the signal input unit 42, the control unit 45 instructs the switch drive circuit 32 and the first drive circuit 21 to switch on the circuit switch 30 and the first switch 20, respectively. Thus, the circuit switch 30 and the first switch 20 are switched on. As a result, the first load E operates and the load current value exceeds the current threshold value Ith.

It is assumed that the voltage output to the first drive circuit 21 has been fixed at the high level voltage and an ON failure has occurred while the first switch 20 is on. When the stop signal indicating the first load E is input to the signal input unit 42, the control unit 45 instructs the first drive circuit 21 to switch off the first switch 20. However, an ON failure has occurred, and therefore the load current value does not decrease to a value no higher than the current threshold value Ith.

The control unit 45 detects the occurrence of an ON failure because the load current value is higher than the current threshold value Ith despite the instruction to switch off the first switch 20. Upon detecting the ON failure, the control unit 45 instructs the switch drive circuit 32 to switch off the circuit switch 30, and changes the value of the flag to 1. As a result, the load current value decreases to zero A, and the first load E stops operating.

Effects of Power Supply Control Device 10

The power supply control device 10 according to the third embodiment achieves the same effects as those achieved by the power supply control device 10 according to the first embodiment.

Fourth Embodiment

In the third embodiment, in the case where the control unit 45 in the second controller H detects an ON failure or an OFF failure in the first switch 20, the time at which the circuit switch 30 is switched off is not limited to the time immediately after the ON failure or the OFF failure is detected in the first switch 20.

The following describes a fourth embodiment in terms of the differences from the third embodiment. Components other than those described below are the same as those in the third embodiment. Therefore, the same reference numerals as in the third embodiment are given to the same components as in the third embodiment, and the descriptions of those components are omitted.

When the third and fourth embodiments are compared with each other, the contents of the first power supply control processing performed by the control unit 45 of the second controller H are different. In the following description, the first power supply control processing according to the fourth embodiment will be described.

First Power Supply Control Processing

Figure 19:
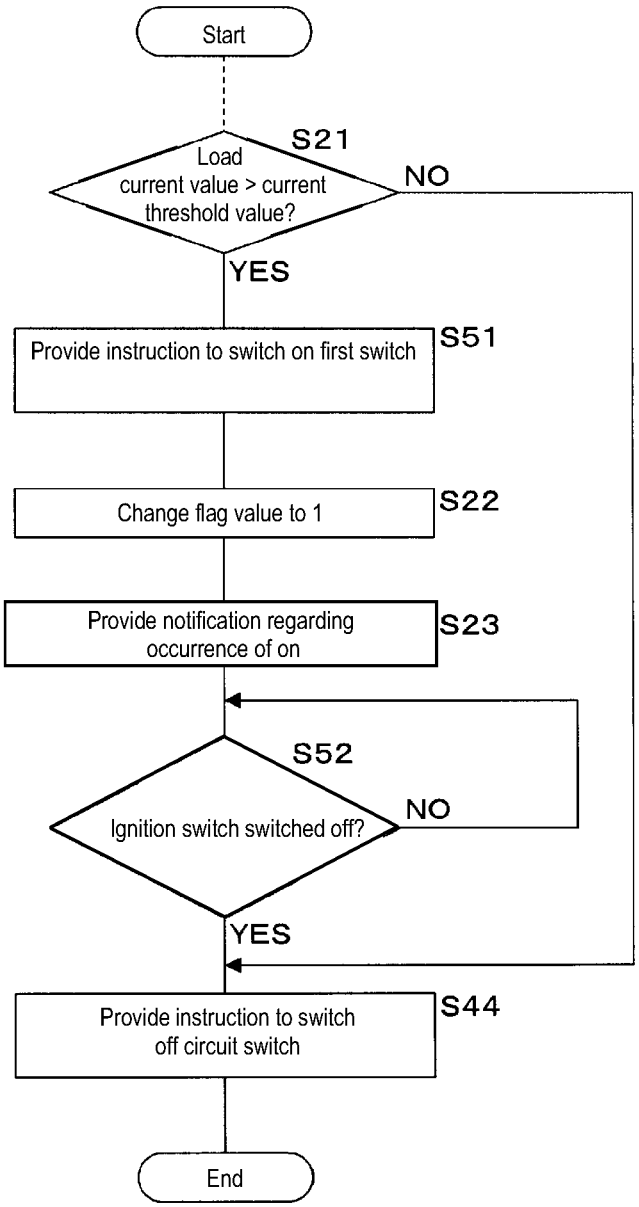
FIG. 19 is a flowchart showing procedures for first power supply control processing according to a fourth embodiment.

FIG. 19 is a flowchart showing procedures for first power supply control processing. The first power supply control processing according to the fourth embodiment is performed while the first switch 20 is off as in the third embodiment. In the first power supply control processing according to the fourth embodiment, the control unit 45 performs the steps S11, S12, S14 to S23, and S41 to S44 in the first power supply control processing according to the third embodiment in the same manner. Therefore, the detailed descriptions of steps S11, S12, S14 to S23, and S41 to S44 will be omitted. In the first power supply control processing according to the fourth embodiment, the control unit 45 performs two instances of processing in addition to steps S11, S12, S14 to S23, and S41 to S44.

As described for the first and third embodiments, the control unit 45 performs step S21 in the state where an instruction to switch off the first switch 20 has been provided. Upon determining that the load current value is higher than the current threshold value (S21: YES), the control unit 45 provides an instruction to switch on the first switch 20 by causing the first output unit T to output the high level voltage (step S51). After performing step S51, the control unit 45 performs step S22.

After performing step S23, the control unit 45 determines whether or not the ignition switch of the vehicle C has been switched off, based on the ignition signal input to the signal input unit 42 (step S52). Upon determining that the ignition switch has not been switched off (S52: NO), the control unit 45 performs step S52 again and waits until the ignition switch is switched off. Upon determining that the load current value is no higher than the current threshold value (S21: NO) or the ignition switch has been switched off (S52: YES), the control unit 45 performs step S44.

Example of Operation of Power Supply Control Device 10

Figure 20:
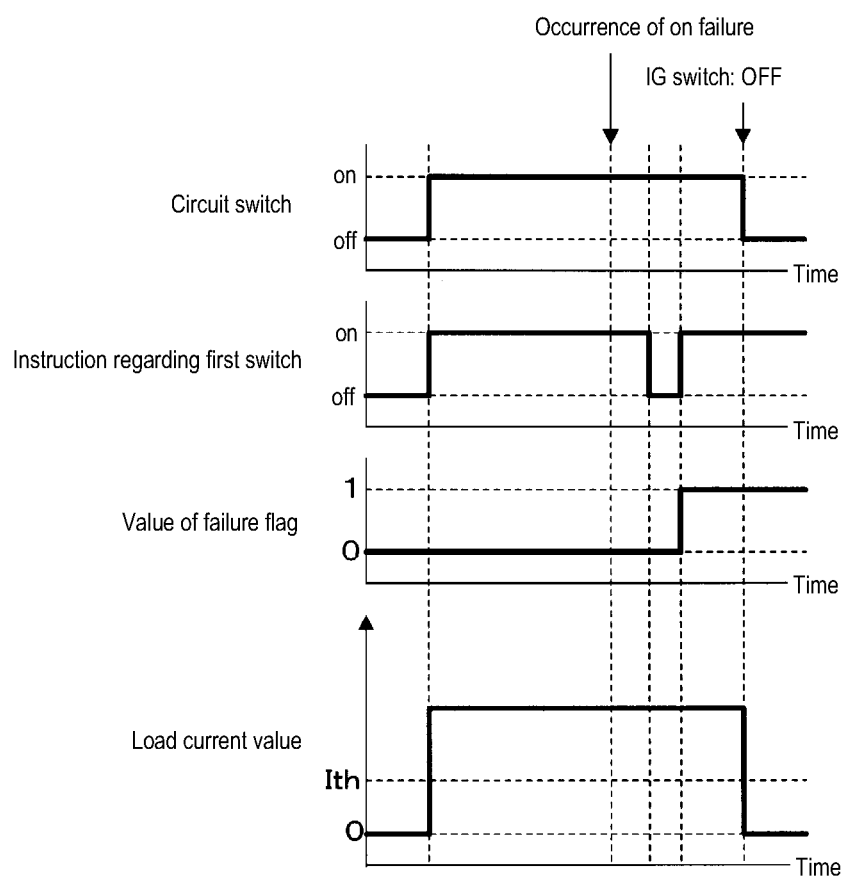
FIG. 20 is a timing chart showing an example of an operation of a power supply control device.

FIG. 20 is a timing chart showing an example of the operation of the power supply control device 10. FIG. 20 shows an example of the operation in the case where an ON failure occurs in the first switch 20. Therefore, FIG. 20 corresponds to FIG. 18. As with FIG. 18, FIG. 20 shows the transition of the state of the circuit switch 30, the transition of the instruction regarding the first switch 20, the transition of the value of the failure flag, and the transition of the load current value. As described for the first embodiment, the IG switch represents an ignition switch. Ith represents a current threshold value.

If neither an OFF failure nor an ON failure has not occurred in the first switch 20, the value of the failure flag is zero. When the first switch 20 or the circuit switch 30 is off, the load current value is zero A, which is no higher than the current threshold value Ith.

As described for the first and third embodiments, when the actuation signal indicating the first load E is input to the signal input unit 42, the control unit 45 instructs the switch drive circuit 32 and the first drive circuit 21 to switch on the circuit switch 30 and the first switch 20, respectively. Thus, the circuit switch 30 and the first switch 20 are switched on.

As a result, the first load E operates and the load current value exceeds the current threshold value Ith.

It is assumed that the voltage output to the first drive circuit 21 has been fixed at the high level voltage and an ON failure has occurred while the first switch 20 is on. When the stop signal indicating the first load E is input to the signal input unit 42, the control unit 45 instructs the first drive circuit 21 to switch off the first switch 20. However, an ON failure has occurred, and therefore the load current value does not decrease to a value no higher than the current threshold value Ith.

The control unit 45 detects the occurrence of an ON failure because the load current value is higher than the current threshold value Ith despite the instruction to switch off the first switch 20. Upon detecting an ON failure, the control unit 45 instructs the first drive circuit 21 to switch on the first switch 20, and changes the value of the flag to 1. Thereafter, the control unit 45 waits until the ignition switch is switched on with the circuit switch 30 being kept on. When the ignition switch is switched off, the control unit 45 instructs the switch drive circuit 32 to switch off the circuit switch 30. Thus, the circuit switch 30 is switched off. As a result, the load current value decreases to zero A, and the first load E stops operating.

The first load E according to the fourth embodiment is an electric device that is required to continue to operate if it cannot be actuated again, as with the first load E according to the first embodiment. If an ON failure occurs in the first switch 20, the operation of the first load E is stopped when the ignition switch is switched off, i.e., when the operation of the vehicle C is terminated.

Effects of Power Supply Control Device 10

In the power supply control device 10 according to the fourth embodiment, if an ON failure occurs in the first switch 20, the circuit switch 30 is kept on until the ignition switch is switched off, so that the operation of the first load E continues. When the ignition switch is switched off, the switch drive circuit 32 switches the circuit switch 30 off and stops power supply to the first load E.

The power supply control device 10 according to the fourth embodiment achieves the same effects as those achieved by the power supply control device 10 according to the third embodiment.

Fifth Embodiment

In the first embodiment, the power supply control device 10 controls power supply to a single first load E. However, the number of first loads E for which power supply is controlled by the power supply control device 10 is not limited to one. The following describes a fifth embodiment in terms of the differences from the first embodiment. Components other than those described below are the same as those in the first embodiment. Therefore, the same reference numerals as in the first embodiment are given to the same components as in the first embodiment, and the descriptions of those components are omitted.

Configuration of Power System 1

Figure 21:
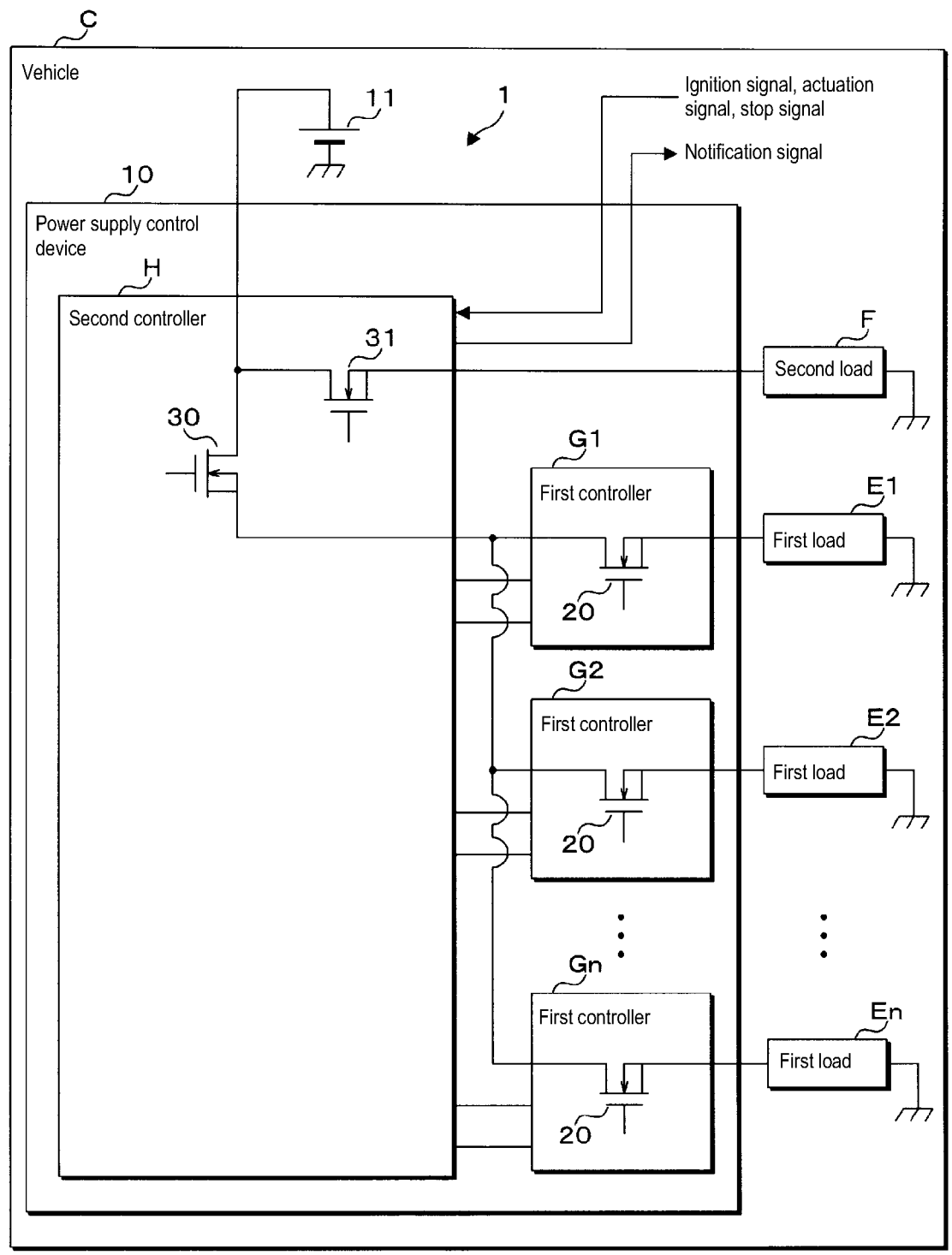
FIG. 21 is a block diagram showing a configuration of a main portion of a power system according to a fifth embodiment.

FIG. 21 is a block diagram showing a configuration of a main portion of a power system 1 according to the fifth embodiment. The power system 1 according to the fifth embodiment includes the components other than the first load E of the power system 1 according to the first embodiment. The power system 1 according to the fifth embodiment, n first loads E1, E2, . . . , and En instead of the first load E. Here, n is an integer no less than 2. Hereinafter, an integer no less than 1 and no greater than n is denoted as i. Therefore, i may be any integer that belongs to the range of 1 to n inclusive.

The power supply control device 10 is connected to one end of each first load Ei, separately. The other end of each first load Ei is grounded. The DC power source 11 supplies power to each first load Ei via the power supply control device 10. The power supply control device 10 controls power supply to each of the n first loads E1, E2, ..., and En and the second load F, separately. The actuation signal indicates the load to be actuated, of the n first loads E1, E2, ..., and En and the second load F. The stop signal indicates the load to be stopped from operating, of the n first loads E1, E2, ..., and En and the second load F.

Configuration of Power Supply Control Device 10

The power supply control device 10 according to the fifth embodiment includes the components other than the first controller G of the power supply control device 10 according to the first embodiment. The power supply control device 10 according to the fifth embodiment includes n first controllers G1, G2, ..., and Gn instead of the first controller G. The first controller Gi has the same configuration as the first controller G according to the first embodiment. Therefore, the first controller Gi includes a first switch 20. In the first controller Gi, the source of the first switch 20 is connected to one end of the first load Ei. The drain of the first switch 20 is connected to the source of the circuit switch 30 included in the second controller H. The first controller G1, G2, ..., and Gn are formed on n first substrates B1, respectively.

When both the first switch 20 in the first controller Gi and the circuit switch 30 in the second controller H are on, currents flows from the positive electrode of the DC power source 11 to the circuit switch 30, the first switch 20, and the first load Ei in this order. As a result, power is supplied to the first load Ei. As described above, the circuit switch 30 and the first switch 20 are provided on the current path of the current flowing via the first load Ei.

When the circuit switch 30 and the n first switches 20 are on, the current flowing via the circuit switch 30 is divided into n currents. These currents flow via n first loads E1, E2, ..., and En, respectively.

When at least either the first switch 20 in the first controller Gi or the circuit switch 30 in the second controller H is off, no current flows through the first load Ei. At this time, power supply to the first load Ei has been stopped.

While the circuit switch 30 is on, the second controller H instructs the first controller Gi to perform an operation regarding power supply to the first load Ei. The second controller H provides an instruction to turn the first switch 20 on or off as an operation regarding power supply to the first load Ei. The first controller Gi switches the first switch 20 on or off according to the instruction from the second controller H. Thus, power supply to the first load Ei is controlled.

The first controller Gi has the same configuration as the first controller G according to the first embodiment. The operation performed by the second controller H for the first controller Gi is the same as the operation performed by the second controller H for the first controller G in the first embodiment.

Configuration of Microcomputer 34 in Second Controller H

Figure 22:
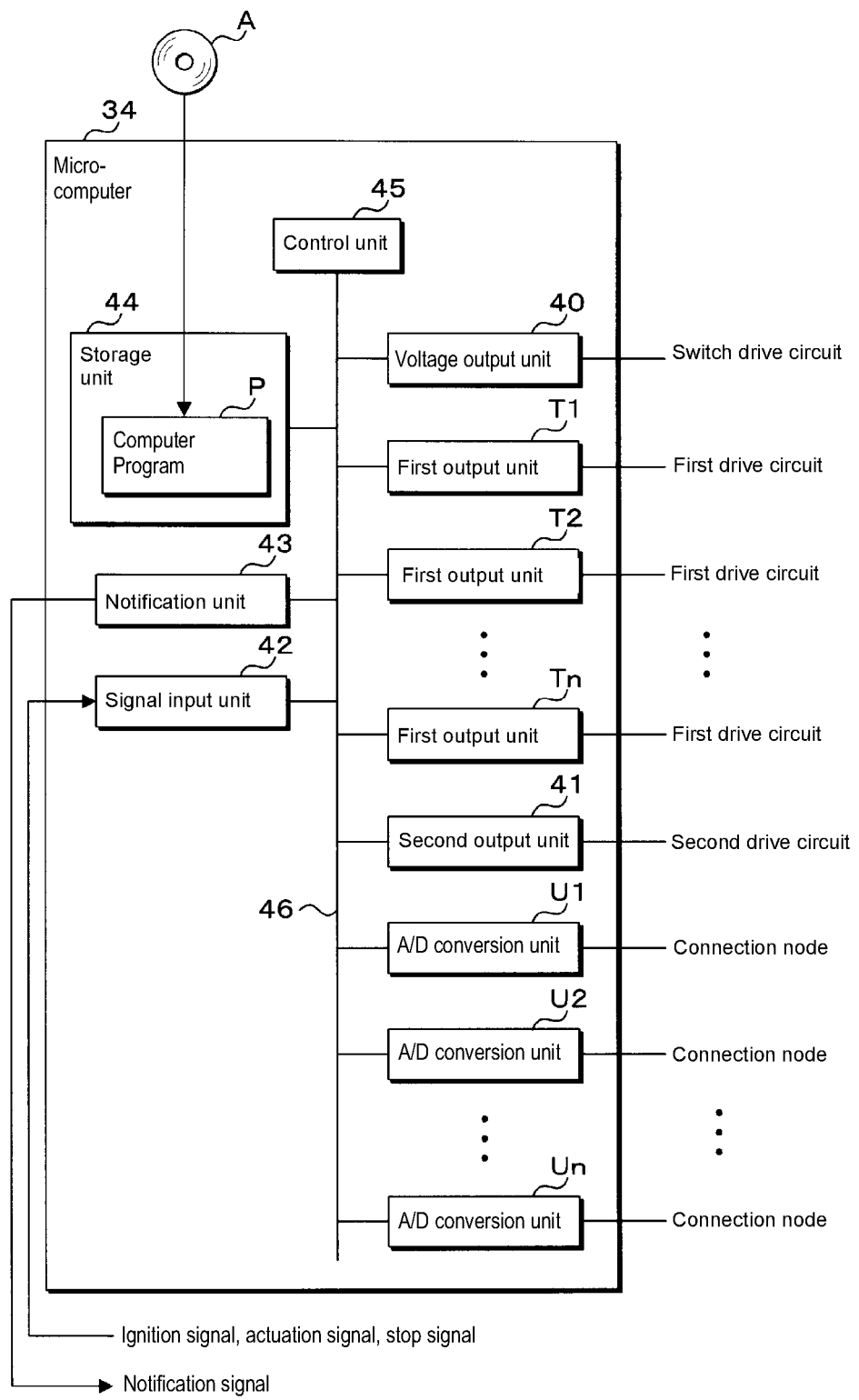
FIG. 22 is a block diagram showing a configuration of a main portion of a microcomputer.

FIG. 22 is a block diagram showing a configuration of a main portion of the microcomputer 34. The microcomputer 34 according to the fifth embodiment includes the components other than the first output unit T or the A/D conversion unit U, of the microcomputer 34 according to the first embodiment. The microcomputer 34 according to the fifth embodiment includes n first output units T1, T2, ..., and Tn instead of the first output unit T. Furthermore, the microcomputer 34 according to the fifth embodiment includes n A/D conversion units U1, U2, ..., and Un instead of the A/D conversion unit U. The first output unit Ti and the A/D conversion unit Ui are connected to the internal bus 46. The first output unit Ti is further connected to the first drive circuit 21 in the first controller Gi. The A/D conversion unit Ui is further connected to the connection node between the current output unit 22 and the resistor 23 included in the first controller Gi.

The first output unit Ti acts in the same manner as the first output unit T according to the first embodiment. Therefore, the control unit 45 provides an instruction to switch the first switch 20 in the first controller Gi on or off by causing the first output unit Ti to output the high level voltage or the low level voltage. The A/D conversion unit Ui acts in the same manner as the A/D conversion unit Ui according to the first embodiment. Therefore, the control unit 45 acquires current value information from the A/D conversion unit Ui. The current value information acquired from the A/D conversion unit Ui indicates the load current value of the current flowing via the first switch 20 in the first controller Gi and the first load Ei.

The processing elements in the control unit 45 perform switch control processing, n instances of first power supply control processing and second power supply control processing by executing the computer program P. The control unit 45 performs switch control processing and second power supply control processing in the same manner as in the first embodiment. A failure flag value of zero means that neither an ON failure nor an OFF failure has occurred in all of the first switches 20. A failure flag value of 1 means an ON failure or an OFF failure has occurred in at least one of the n first switches 20.

The n instances of first power supply control processing are processing performed to control power supply to the n first loads E1, E2, ..., and En, respectively. The control unit 45 performs n instances of first power supply control processing in the same manner as the first power supply control processing in the first embodiment. In the first power supply control processing for the first load Ei, the control unit 45 determines whether or not to actuate the first load Ei, based on whether or not an actuation signal indicating the first load Ei has been input. The control unit 45 determines whether or not to stop the operation of the first load E, based on whether or not a stop signal indicating the first load Ei has been input. The control unit 45 provides an instruction to switch the first switch 20 in the first controller Gi on or off. The control unit 45 acquires current value information from the A/D conversion unit Ui.

The first loads E1, E2, ..., and En are each an electric device that does not interfere with the operation of the vehicle C even if the device is constantly out of operation. Therefore, if an ON failure or an OFF failure occurs in at least one of the n first switches 20, the control unit 45 provides an instruction to switch off the circuit switch 30. As a result, the switch drive circuit 32 switches the circuit switch 30 off.

Effects of Power Supply Control Device 10 n the power supply control device 10 according to the fifth embodiment, the circuit switch 30 is provided upstream of the n first switches 20. Power supply to the n first loads E1, E2, ..., and En can be stopped by switching off the circuit switch 30.

The power supply control device 10 according to the fifth embodiment achieves the same effects as those achieved by the power supply control device 10 according to the first embodiment.

Sixth Embodiment

In the fifth embodiment, in the case where the control unit 45 in the second controller H detects an ON failure or an OFF failure in at least one of the n first switches 20, the time at which the circuit switch 30 is switched off is not limited to the time immediately after the ON failure or the OFF failure is detected in the first switch 20.

The following describes a sixth embodiment in terms of the differences from the fifth embodiment. Components other than those described below are the same as those in the fifth embodiment. Therefore, the same reference numerals as in the first embodiment are given to the same components as in the first embodiment, and the descriptions of those components are omitted.

When the fifth and sixth embodiments are compared with each other, the contents of the switch control processing and the n instances of first power supply control processing performed by the control unit 45 of the second controller H are different. In the sixth embodiment, the control unit 45 performs switch control processing and second power supply control processing in the same manner as in the second embodiment.

The control unit 45 performs n instances of first power supply control processing in the same manner as the first power supply control processing in the second embodiment. In the first power supply control processing for the first load Ei, the control unit 45 determines whether or not to actuate the first load Ei, based on whether or not an actuation signal indicating the first load Ei has been input. The control unit 45 determines whether or not to stop the operation of the first load E, based on whether or not a stop signal indicating the first load Ei has been input. The control unit 45 provides an instruction to switch the first switch 20 in the first controller Gi on or off. The control unit 45 acquires current value information from the A/D conversion unit Ui.

In the sixth embodiment, if an ON failure or an OFF failure occurs in at least one of the n first switches 20, the control unit 45 keeps the circuit switch 30 on until the ignition switch is switched off. In the sixth embodiment, the n first loads E1, E2, . . . , and En include an electric device that is required to continue to operate if it cannot be actuated again.

Effects of Power Supply Control Device 10

The power supply control device 10 according to the sixth embodiment achieves the same effects as those achieved by the power supply control device 10 according to the fifth embodiment.

Modifications

In the first to sixth embodiments, the power supply system 1 may not include the second load F. If this is the case, the second controller H in the power supply control device 10 does not include the second switch 31 or the second drive circuit 33. In this case, the second switch 31 and the second drive circuit 33 are not to be provided on the second substrate B2.

In the fifth and sixth embodiments, if an OFF failure occurs in the n first switches 20, the value of the failure flag may be kept at zero instead of being changed to 1. In this case, the control unit 45 changes the value of the failure flag to 1 only when an ON failure occurs in at least one of the n first switches 20.

In the second, fourth, and sixth embodiments, if the control unit 45 detects the occurrence of an ON failure or an OFF failure, the control unit 45 provides an instruction to switch off the circuit switch 30 when the ignition switch is switched off. Here, the time at which the control unit 45 provides an instruction to switch off the circuit switch 30 is not limited to the time at which the ignition switch is switched off, and may be any time at which the vehicle C stops travelling. Therefore, the time at which the control unit 45 provides an instruction to switch off the circuit switch 30 may be the time at which the vehicle C is parked. For example, the control unit 45 may determine whether or not the vehicle C has been parked based on the position of the shift lever of the vehicle C.

In each of the first drive circuits 21 according to the first to sixth embodiments, the position where the current input terminal from which power is supplied is connected is not limited to a position that is downstream of the circuit switch 30, and may be a position that is upstream position of the circuit switch 30. In such a configuration, the DC power source 11 constantly supplies power to the first drive circuit 21.

In the first to sixth embodiments, the first drive circuit 21 may switch on the first switch 20 when the voltage output to the first drive circuit 21 is switched to the low level voltage. If this is the case, the first drive circuit 21 switches the first switch 20 off when the voltage output to the first drive circuit 21 is switched to the high level voltage. With this configuration, the control unit 45 provides an instruction to switch on the first switch 20 by causing the first output unit T or the first output unit Ti to output the low level voltage. Similarly, the control unit 45 provides an instruction to switch off the first switch 20 by causing the first output unit T or the first output unit Ti to output the high level voltage.

When the connection line connecting the first drive circuit 21 and the microcomputer 34 is grounded, the voltage output to the first drive circuit 21 is fixed at the low level voltage. In this case, an ON failure occurs in the above-described configuration. When the connection line connecting the first drive circuit 21 and the microcomputer 34 is electrically connected to the connection line connecting the first switch 20 and the circuit switch 30 while the circuit switch 30 is on, the voltage output to the first drive circuit 21 is fixed at the high level voltage. In this case, an OFF failure occurs in the above-described configuration.

In the first to sixth embodiments, the control unit 45 may detect an ON failure or an OFF failure in the second switch 31 as in the first switch 20, based on the current value of the current flowing via the second switch 31. The first switch 20, the circuit switch 30, and the second switch 31 each need only function as a switch, and therefore are each not limited to being an N-channel FET. The first switch 20, the circuit switch 30, and the second switch 31 may each be a P-channel FET, a bipolar transistor, a relay contact, or the like.

The first to sixth embodiments disclosed herein should be considered illustrative in all respects and not restrictive. The scope of the present disclosure is indicated by the scope of the claims rather than the meaning described above, and is intended to include all changes within the meaning and scope equivalent to the scope of the claims.

The invention claimed is:

1. A power supply control device that is for a vehicle and controls power supply to a load, the power supply control device comprising:

a controller that is formed on a first substrate and controls power supply to the load; and
an instructor that is formed on a second substrate that is different from the first substrate, and instructs the controller to perform an operation regarding the power supply,
wherein the controller includes a load switch that is provided on a current path of a current flowing via the load, the load switch disposed on the first substrate,
the instructor includes
a circuit switch provided on the current path, and
a processing unit that performs processing, and
the processing unit provides an instruction to switch the load on or off.

2. The power supply control device according to claim 1, wherein the processing unit in the instructor
provides an instruction to switch off the load switch while the circuit switch is on,
acquires a current value of a current flowing through the current path, after providing an instruction to switch off the load switch,
determines whether or not the acquired current value is higher than a current threshold value, and
provides an instruction to switch off the circuit switch upon determining that the current value is higher than the current threshold value.

3. The power supply control device according to claim 2, wherein the processing unit in the instructor
determines whether or not an ignition switch of the vehicle has been switched off, and
in a case of determining that the current value is higher than the current threshold value, provides an instruction to switch off the circuit switch upon determining that the ignition switch of the vehicle has been switched off.

4. The power supply control device according to claim 1, wherein the load is provided as two or more loads and the load switch is provided as two or more load switches,
a plurality of load switches are provided on current paths of a plurality of currents flowing via a plurality of loads, respectively, and
a current flowing via the circuit switch is divided into the plurality of currents.

5. The power supply control device according to claim 1, wherein the controller includes a switching circuit that switches the load switch on or off,
a current flows through the circuit switch and the load switch in this order,
power is supplied to the switching circuit via the circuit switch, and
the processing unit in the instructor provides an instruction to switch off the circuit switch upon the ignition switch of the vehicle being switched off.

6. The power supply control device according to claim 2, wherein the load is provided as two or more loads and the load switch is provided as two or more load switches,
a plurality of load switches are provided on current paths of a plurality of currents flowing via a plurality of loads, respectively, and
a current flowing via the circuit switch is divided into the plurality of currents.

7. The power supply control device according to claim 3, wherein the load is provided as two or more loads and the load switch is provided as two or more load switches,
a plurality of load switches are provided on current paths of a plurality of currents flowing via a plurality of loads, respectively, and
a current flowing via the circuit switch is divided into the plurality of currents.

8. The power supply control device according to claim 2, wherein the controller includes a switching circuit that switches the load switch on or off,
a current flows through the circuit switch and the load switch in this order,
power is supplied to the switching circuit via the circuit switch, and
the processing unit in the instructor provides an instruction to switch off the circuit switch upon the ignition switch of the vehicle being switched off.

9. The power supply control device according to claim 3, wherein the controller includes a switching circuit that switches the load switch on or off,
a current flows through the circuit switch and the load switch in this order,
power is supplied to the switching circuit via the circuit switch, and
the processing unit in the instructor provides an instruction to switch off the circuit switch upon the ignition switch of the vehicle being switched off.

10. The power supply control device according to claim 4, wherein the controller includes a switching circuit that switches the load switch on or off,
a current flows through the circuit switch and the load switch in this order,
power is supplied to the switching circuit via the circuit switch, and
the processing unit in the instructor provides an instruction to switch off the circuit switch upon the ignition switch of the vehicle being switched off.

11. A power supply control method for a power supply control device for a vehicle, the power supply control device including: a controller that is formed on a first substrate and controls power supply to a load; and an instructor that is formed on a second substrate that is different from the first substrate, and instructs the controller to perform an operation regarding the power supply, the controller including a load switch that is provided on a current path of a current flowing via the load, the instructor including a circuit switch provided on the current path, the power supply control method comprising steps that are to be carried out by a computer, the steps including:
a step of providing an instruction to switch off the load switch while the circuit switch is on;
a step of acquiring a current value of a current flowing through the current path, after providing an instruction to switch off the load switch;
a step of determining whether or not the acquired current value is higher than a current threshold value; and
a step of providing an instruction to switch off the circuit switch upon determining that the current value is higher than the current threshold value.

12. A computer program for enabling a computer to control power supply in a power supply control device for a vehicle, the power supply control device including: a controller that is formed on a first substrate and controls power supply to a load; and an instructor that is formed on a second substrate that is different from the first substrate, and instructs the controller to perform an operation regarding the power supply, the controller including a load switch that is provided on a current path of a current flowing via the load, the instructor including a circuit switch provided on the current path, the computer program enabling the computer to carry out:

a step of providing an instruction to switch off the load switch while the circuit switch is on;

a step of acquiring a current value of a current flowing through the current path, after providing an instruction to switch off the load switch;

a step of determining whether or not the acquired current value is higher than a current threshold value; and a step of providing an instruction to switch off the circuit switch upon determining that the current value is higher than the current threshold value.

\* \* \* \* \*